US006804677B2

(12) United States Patent
Shadmon et al.

(10) Patent No.: US 6,804,677 B2
(45) Date of Patent: Oct. 12, 2004

(54) ENCODING SEMI-STRUCTURED DATA FOR EFFICIENT SEARCH AND BROWSING

(75) Inventors: Moshe Shadmon, Palo-Alto, CA (US); Neal Sample, Santa-Cruz, CA (US); Brian Cooper, Mountain View, CA (US); Michael J. Franklin, Piedmont, CA (US)

(73) Assignee: Ori Software Development Ltd., Tel Aviv (IL)

( * ) Notice: Subject to any disclaimer, the term of this patent is extended or adjusted under 35 U.S.C. 154(b) by 378 days.

(21) Appl. No.: 09/791,579

(22) Filed: Feb. 26, 2001

(65) Prior Publication Data

US 2002/0120598 A1 Aug. 29, 2002

(51) Int. Cl.[7] .................................................. G06F 7/00
(52) U.S. Cl. ........................ 707/101; 700/102; 715/513; 715/516; 715/517
(58) Field of Search ............................... 707/1, 2, 3, 4, 707/5, 6, 7, 100, 101, 102, 103; 715/515, 513, 516, 517

(56) References Cited

U.S. PATENT DOCUMENTS

| | | | |
|---|---|---|---|
| 6,094,649 A | 7/2000 | Bowen et al. | |
| 6,154,738 A | 11/2000 | Call | |
| 6,175,835 B1 | 1/2001 | Shadmon | 707/102 |
| 6,507,846 B1 * | 1/2003 | Consens | 707/100 |
| 6,584,459 B1 * | 6/2003 | Chang et al. | 707/73 |

FOREIGN PATENT DOCUMENTS

| WO | WO 98/04980 | 2/1998 |
|---|---|---|
| WO | WO 99/38094 | 7/1999 |

OTHER PUBLICATIONS

Girardot M. et al.: "Millau: An encoding format for efficient representation and exchange of XML over the web" Computer Networks and ISDN Systems, North Holland Publishing, Amsterdam, NL vol. 33, No. 1–6, Jun. 2000, pp. 747–765, XP001005949 ISSN: 0169–7552.

Anderssin A. et al.: "Efficient implementation of suffix trees" Software Practice & Experience, John Wiley & Sons Ltd., Chichester, GB vol. 25, No. 2, Feb. 1, 1995, XP000655496 ISSN: 0038–0644.

Liefke H. et al.: "XMILL: an efficient compressor for XML data" Sigmod Record, Association for Computing Machinery, New York, US, vol. 29, No. 2, Jun. 2000, pp. 153–164, XP001002286.

"The Art of Computer Programming"(1973, Addison–Wesley), vol. 3, Donald Knuth, pp. 473–479.

"The Art of Computer Programming"(1973, Addison–Wesley), vol. 3, Donald Knuth, pp. 552–559.

The American Heritage Dictionary of the English Language, Third Edition, 1996, by Houghton Mifflin Company, "Of or relating to meaning, especially meaning in language".

"Keys for XML", Peter Buneman et al., Aug. 9 2000, pp.1–14.

"Oracle8i—The XML EnabledData Management System", Sandeepan Banerjee et al., 2000, 8 pages.

"XML and DB2", Josephine Cheng et al., 2000, 5 pages.

(List continued on next page.)

Primary Examiner—Shahid Alam
Assistant Examiner—Isaac Woo
(74) Attorney, Agent, or Firm—Oliff & Berridge, PLC

(57) ABSTRACT

A method for encoding XML tree data that includes the step of encoding the semi-structured data into strings of arbitrary length in a way that maintains non-structural and structural information about the XML data, and enables indexing the encoded XML data in a way facilitates efficient search and browsing.

4 Claims, 12 Drawing Sheets

OTHER PUBLICATIONS

"The Lorel Query Language for Semistructured Data", International Journal of Digital Libraries, 1(1), Apr. 1997, Department of Computer Science, Stanford University, Serge Abiteboul et al., pp. 68–88.

XML Path Language (XPath), Version 1.0, W3C Recommendation 16, Nov. 1999, James Clark et al., pp. 1–48.

"Quilt: An XML Query Language for Heterogeneous Data Sources", International Workshop on the Web and Databases (WebDB'2000), Dallas, Texas, May 2000, Don Chamberlin et al., 25 pages.

P. Ferragina et al, "The String B–Tree: A new Data Structure for String Search in External Memory and its Applications", Journal of the ACM 46 (2), Mar. 1999, pp.236–280.

P. Ferragina et al, "An experimental study of SB–trees", (Jun. 1996), NECResearchIndex.

P. Ferragina et al, "A Fully–Dynamic Data Structure for External Substring Search" ACM Symposium on Theory of Computing (1995), pp. 693–702.

* cited by examiner

```
<Invoice>
  <Buyer>
     <Name>ABC Corp.</Name>
     <Address>123 Industry Way</Address>
  </Buyer>
  <Seller>
     <Name>Goods Inc.</Name>
     <Address>17 Business Circle</Address>
  </Seller>
  <Number num = "70357" />
  <ItemList>
     <Item count = "3" discount= "0.10">widget</Item>
     <Item count = "4" >thingy</Item>
     <Item count = "1" >jobber</Item>
     </ItemList>
</Invoice>
```

| XML | TOKEN | TYPE |
|---|---|---|
| Invoice | A | Tag |
| Buyer | B | Tag |
| Seller | C | Tag |
| Number | D | Tag |
| ItemList | E | Tag |
| Name | F | Tag |
| Address | G | Tag |
| Item | H | Tag |
| Count | I | Attribute |
| Discount | J | Attribute |
| Num | K | Attribute |

| XML Path | XML Path String |
|---|---|
| A → B → F → ABC Corp. | ABFABC Corp. |
| A → B → G → 123 INDUSTRY WAY | ABG123 Industry Way |
| A → C → F → Goods Inc. | ACFgoods Inc |
| A → C → G → 17 Business Circle | ACG17 Business Circle |
| A → D → K → 70537 | ADK70357 |
| A → E → H → I → 3 | AEHI3 |
| A → E → H → J → 0.10 | AEHJ 0.10 |
| A → E → H → Wlidget | AEHwidget |
| A → E → H → I → 4 | AEHI4 |
| A → E → H → Thingy | AEHthingy |
| A → E → H → I → 1 | AEHI1 |
| A → E → H → Jobber | AEHjobber |

ENCODING SEMI-STRUCTURED DATA FOR EFFICIENT SEARCH AND BROWSING

FIELD OF THE INVENTION

The preset invention is in the general field of accessing data including but not limited to eXtensible Markup Language (XML) documents.

BACKGROUND OF THE INVENTION

There follows a glossary of conventional terms. The meaning of terms are generally known per se and accordingly the definitions below are provided for clarity and should not be regarded as binding.
Glossary of Terms Data—Information that one wants to store and/or manipulate.
Database—A collection of data organized by some set of rules.
Attribute—A feature or characteristic of specific data, represented e.g. as "columns" in a relational database. A record representing a person might have an attribute "age" that stores the person's age. Each column represents an attribute. In XML (XNM is defined below), there is an "attribute" that exists as part of a "tag."
Column—In a relational database, columns represent attributes for particular rows in a relation. For example, a single row might contain a complete mailing address. The mailing address would have four columns ("attributes"): street address, city, state, and zip code.
Record—A single entry in a database. Often referred to as a "tuple" or "row" in a relational database.
Tuple—See "record"
Row—See "record"
Table—See "relation"
Relation—A way of organizing data into a table consisting of logical rows and columns. Each row represents a complete entry in the table. Each column represents an attribute of the row entries. Frequently referred to as a "table."
Relational database—A database that consists of one or more "relations" or "tables"
Database administrator—A person (or persons) responsible for optimizing and maintaining a particular database
Schema—The organization of data in a database. In a relational database, all new data that comes into the database must be consistent with the schema, or the database administrator must change the schema (or reject the new data).
Index—Extra information about a database used to reduce the time required to find specific data in the database. It provides access to particular rows based on a particular column or columns.
Path—A series of relationships among data elements. For instance, a path from a grandson to grandfather would be two steps: from son to father, and from father to grandfather.
Structure—The embodiment of paths in particular documents or data For example, in a "family tree," the structure of the data is hierarchical: it is a tree with branches from parents to children. Data without a hierarchical structure is often referred to as "flat."
Query—A search for information in a database.
Range query—A search for a range of data values, like "all employees aged 25 to 40."

I/O—A read from a physical device, such a fixed disk (hard drive). I/Os take a significant amount of time compared to memory operations: usually hundreds and even thousands of times (or more) longer.
Block read—Reading a fixed sized chunk of information for processing. A block read implies an "I/O" if the block is not in memory.
Tree—A data structure that is either empty or consists of a root node linked by means of d (d ? 0) pointers (or links) to d disjoint trees called subtrees of the root. The roots of the subtrees are referred to as "child nodes" of the root node of the tree, and nodes of the subtrees are "descendent nodes" of the root. A node in which all the subtrees are empty is called a "leaf node." The nodes in the tree that arc not leaves are designated as "internal nodes."

In the context of the invention, leaf nodes are also nodes that are associated with data.
Nodes and trees should be construed in a broad sense. Thus, the definition of tree encompasses also a tree of blocks wherein each node constitutes a block In the same manner, descendent blocks of a said block are all the blocks tat can be accessed from the block For detailed definition of "tree," also refer to the book by Lewis and Deneberg, "Data structures and their algorithms."

B-tree—A tree structure that can be used as an index in a database. It is useful for exact match and range queries. B-trees frequently require multiple block reads to access a single record. A more complete description of B-trees can be found on pages 473–479 of *The Art of Computer Programming*, volume 3, by Donald Ktiuth (© 1973, Addison-Wesley).
Hash table—A structure that can be used as an index in a database. It is useful for exact match queries. It is not useful for range queries. Hash tables generally require one block read to access a single record. A more complete description of hash tables can be found on e.g. pages 473–479 of *The Art of Computer Programming*, volume 3, by Donald Knuth (© 1973, Addison-Wesley).
Inverted list—A structure that can be used as an index in a database. It is a set of character strings that points to records that contain particular strings. For example, an inverted list may have an entry "hello." The entry "hello" points to all database records that have the word "hello" as part of the record. A more complete description of inverted lists can be found on e.g. pages 552–559 of *The Art of Computer Programming*, volume 3, by Donald Knuth (© 1973, Addison-Wesley).
Semi-structured data—Data that does not conform to a fixed schema. Its format is often irregular or only loosely defined.
Data mining—Searching for useful, previously unknown patterns in a database.
Object—An object is some quantity of data It can be any piece of data, a single path in a document path, or some mixture of structure and data. An object can be a complete record in a database, or formed "on the fly" out of a portion of a record returned as the result of a query.
Markup—In computerized document preparation, a method of adding information to the text indicating the logical components of a document, or instructions for layout of the text on the page or other information which can be interpreted by some automatic system. (from the Free On-Line Dictionary of Computing— www.foldoc.ic.ac.uk)
Markup Language—A language for applying markup to text documents to indicate formatting and logical contents.

Mark up languages are increasingly being used to add logical structure information to documents to enable automated or semi-automated processing of such documents. Many such languages have been proposed, ranging from generic ones such as SGML and XML, to industry or application-specific versions.

SGML—A specific example of Markup Language, Standard Generalized Markup Language. SGML is a means of formally describing a language, in this case, a markup language. A markup language is a set of conventions used together for encoding (e.g., HTML or XML).

XML—A specific example of Markup Language eXtensible Markup Language. A language used to represent semi-structured data. It is a subset of SGML. XML documents can be represented as trees.

Key—An identifier used to refer to particular rows in a database. In the context of relational database, keys represent column information used to identify rows. For instance, "social security number" could be a key that uniquely identifies each individual in a database. Keys may or may not be unique.

Join—A method of match portions of two or more tables to form a (potentially much larger) unified table. This is generally one of the most expensive relational database operations, in terms of space and execution time.

Key search—The search for a particular value or data according to a key value. This search is usually performed by an index Search—In the context of data, searching is the process of locating relevant or desired data from a (typically much larger) set of data based on the content and/or structure of the data. Searching is often done as a batch process, in which a request is submitted to the system, and after processing the request, the system returns the data or references to the data that match the request. Typical (yet not exclusive) examples of searching are the submission of a query to a relational database system, or the submission of key words to a search engine on the World Wide Web.

Path search—The search for a particular path in the database. A "path" is a series of relationships among data elements. For instance, part of an invoice might have the "buyer," and that buyer has an "address" on the invoice. A search for the address of all buyers is really for the path "invoice to buyer to address." This is a search for a particular structure, which is different from key search (the search for particular values). Path search and key search may be combined.

Browsing in the context of data, browsing is the process of interactively locating relevant or desired data by wandering or navigating through a (typically much larger) set of data. Browsing can be done based on data content, structure, or a combination of these. A common example of browsing is the traversal of hyperlinks in the World Wide Web in order to locate relevant web pages.

Access—In the context of data, access is the process of obtaining data, typically though searching, browsing, or through following references.

Sibling—Elements of a tree that share the same parent are siblings. This is the same sense as brothers and sisters are siblings.

Tag—An XML tag represents structural information in an XML document. A tag may or may not surround data and may or may not contain other tags. All tags have a parent, except the first tag. Additionally see "markup."

Parent-child—In a tree, a child is an element that branches from its parent. In XML, if "tag1" immediately surrounds "tag2," then "tag1" is the parent of "tag2." "Tag2" is the child of "tag1."

Token—A short pattern used to represent another pattern

Complete-key indexing—An indexing method that stores the key as part of the index This provides an exact "it or miss" result when using the index, but is very large when the keys are large. This is contrasted with a "compressed-key indexing."

Compressed-key indexing—A compressed-key index does not store the entire key in the index, thus can be significantly smaller than a complete-key index (for the same keys). However, it may provide "false positives" (that can be removed leter). It should not miss relevant records ("false negatives"). This is contrasted with a "complete-key indexing." A Compressed-key indexing is described e.g. in U.S. Pat. No. 6,175,835.

Encoding—Transforming one representation into a different, equivalent representation. For example, representing the Roman numeral "VII" as the decimal number "7" is a form of encoding.

Sibling Order—Semi-structured data stored in files have a specific "order" associated with the data. In a race, finishers are ordered based on their order of appearance across the fish line: "first," "second," "third," etc. With semi-structured data, siblings can be ordered by their appearance in the document.

Semantic information—"Of or relating to meaning, especially meaning in language." (The American Heritage® Dictionary of the English Language, Third Edition,© 1996, 1992 by Houghton Mifflin Company) The difference between the word "orange" used to represent a color and the word "orange" to represent a ha is a "semantic" difference. "Semantic information" is information about the meaning of tags and data.

Syntactic information—Syntax is the study of the rules whereby words or other elements of sentence structure are combined to form proper sentences. "Syntactic information" in semi-structured data represents the tags and data, without information regarding the meaning of the tags and data.

Homonym—A word that is used to designate several different things. The word "bow" represents a stringed weapon, the front of a ship, and a loop of ribbon, among other things. When used with more than one semantic mean "bow" would be an example of a homonyms Synonym—A word having the same or nearly the same meaning as another word in a language. Words like "top," "peak," and "apex" are synonyms in English.

BACKGROUND

The most popular database today is the relational database. In a relational database, data is stored in relations (or "tables"). Tables have columns and rows. The rows are often referred to as "records" and consist of a single related group of data, like a complete mailing address. The columns in the tables represent attributes of the rows. A column in a mailing address table might be "Zip Code," just one part of a row.

Relations are defined by a database administrator, and have a fixed format called a "schema." For instance, the schema for a mailing address relation night be (name, address, city, state, zip), which is a "name" followed by an "address" followed a "city," etc. Each mailing address that appears in the table has to have that exact format. Changes to the schema are quite expensive, and result in significant "downtime" for the database.

The database administrator also builds initial indexes. An index is a data structure that provides very quick access to particular rows, based on particular data values. For instance, a database administrator could make an index over the "zip" column that would make searching for zip codes very fast. Building new indexes over an existing relation can be quite expensive (insofar as space and processing time is concerned).

Relational databases generally index the data using variants of B-trees, hash tables, and inverted lists. These indexes provide good performance when the schema is fixed and when the database administrator has created specific indexes for expected queries. It is generally quite expensive when users wish to perform a query that cannot use an existing index.

As specified above, data to do not conform to a fixed schema are referred to as semi-structured. This type of data is often irregular and only loosely defined. Even in the previous example of a mailing address, one can see how semi-structured data could be used. Imagine a database that takes global mailing addresses. Some addresses would have cities and states, some would include country and country designator, some would have numeric zip codes, some alphanumeric postal codes, and many would include extra information like "office number." They would be very different, depending on where they originated. In all cases, though, even though they do not look the same, they are still instances of a "mailing address."

Perhaps the Be example of semi-structured data is the content available on the Web. On the web, semi-structured data is the rule, not the exception. Just storing and searching simple web pages is difficult because they are all so different. Semi-structured data also appears in business and scientific applications that access (or generate) heterogeneous data stores. Even a simple task like data mining in a database of customer purchases, where the data comes from a seemingly structured source, has at its core a semi-structured data representation: the "shopping basket" Every shopping basket is different and a collection of such baskets is a semi-structured source.

Unlike the relational data stored in a typical database, semi-structured data does not have a strict schema and does not have to conform to a preset format. Because of this, semi-structured data is more interesting at this time Since storage and searching mechanisms are fairly new, by industry standards.

In searching semi-structured data, queries often include information about the structure of the data, not just field contents. For instance, genealogists may care about the grandchildren of a particular historical figure. Such data paths (e.g., the path from "grandparent" to "grandchild") are often explicit in the semi-structured data, but are not stored explicitly in a relational database. At the same time, semi-structured data may be queried over particular attributes, independent of the structure that surrounds those attributes (e.g. key word search).

Also, queries may contain structural constraints about the objects returned. For instance, one may be interested only in "restaurant object" that minimally have a name and address associated with them. These are not queries solely associated with semi-structured data, but the types of queries that may be encountered and that an effective index should account for. A more detailed discussion of paths in semi-structured data can be found in, e.g. "Keys for XML," Bunernan, et al., August 2000.

Relational databases that store structured data are going through a process of incremental refinement, realizing gains in performance at an ever-slowing pace. Semi-structured storage solutions at this time are neither mature nor standardized. Most storage and indexing systems shoehorn semi-structured data into some well-understood structural form such as relational format. This is far from being a practical, scalable solution and there is accordingly room for significant improvement.

There follows discussion in connection with a specific instance of semi-structured data, i.e. the popular XML (eXtensible Markup Language) data. Various academic papers and emerging product focus on the generation, storage, and search of XML. XML has been considered the "lingua galactica" for content exchange over the Internet because it can be used to encode any arbitrary type and quantity of information. As the consideration of XYL has progressed, it has become apparent that it is also an important way to store and search information, not just to transmit it. This importance is reflected in significant industry attention as evidenced e.g. in "Oracle8i—The XML Enabled Data Management System," by Banerjee, et al. and "XML and DB2" by Cheng and Xu.

XML is a well-understood subset of SGML (Standard Generalized Markup Language) that has received significant attention in recent years as the candidate for a clear standard representation of semi-structured data With a growing proportion of electronic business traffic moving to XML, a reliable, scalable, efficient storage and retrieval solution is becoming critical.

The need to handle semi-structured data is growing in step with increasing business outsourcing, systems integration, mergers and acquisitions, and the explosive growth in information available on the Internet. The new e-commerce era sets new demands on data and information exchange. Wherever any two non-identical data sources come together, the choice is costly translation and mediation, specific to those two sources, or an effective semi-structured search and storage system.

In the past, business data generally had to have a significant amount of structure in order to be stored and searched efficiently. That is not to say semi-structured data is in any way a new idea . . . it was frequently avoided before because it can be expensive and difficult to deal with.

Within an organization, some designating authority can specify standard data representations, and all of the data creators and users expect and understand the canonical data format. Within larger organizations, multiple standards may emerge within departments or divisions, and expensive custom translators cam be built and maintained to transfer data between organizational units. Between organizations however, the problem becomes intractable. There are simply too many formats to deal with.

Traditional storage and querying then happened only at the organizational level, and often with just a fraction of an organizations data. There were significant restrictions on how this data could be organized, as well, if it was stored in a commercial database. These restrictions mean that every object in a relation has the same organization, and is just as likely to be over-specified or under-specified, just to fit it into the current mold.

If the data do not have a fixed schema, however, it can be nearly impossible to get good storage and query results from a relational database. The hitherto known solutions for storing XML and other semi-structured data typically use relational databases and generally require breaking the XML apart into chunks that can fit into a table, with non-conforming pieces going into overflow bins of some sort. For XML that is quite different from current database data, new relations are created. For each new relation created, search becomes slower and more difficult.

Even with this approach, intelligent search is still often difficult The tables are flat structures, in rows and columns, with little obvious indication about the underlying data's structure. The data in a relation is like logs on a woodpile: so many rows high, so many columns wide. But XML is like a complete tree, with paths and branches and leaves. Imagine searching the woodpile for the "third branch on the let 17' high in the tree." You could do it by piecing the tree back together from the woodpile, rebuilding the tree until you found your answer, then stacking the wood back on the pile when you were done. This simplified example illustrates how relational databases storing XML data work.

The treatment of bow structured and semi-structured data is usually by index schemes that have A) uniform key structure, and B) do not store complete relationships. Because relational databases break documents apart into tables, some information is no longer explicit in the database and must be reconstructed for each search. For example, an invoice might have a fixed set of fields (i.e., "shipping address" and "billing address") that get stored in one table, and an arbitrary set of fields (i.e., the items on the invoice) that get stored in another table. This is frequently done because it can save a considerable amount of storage space. However, when there is a search that uses one of the relationships that is natural part of the original invoice, but has been split into multiple tables to save space, an expensive reconstruction (i.e., a "join") must occur. This leads to two significant problems: large index size and expensive search for structure.

Searching for structure ("path search" is necessary in certain applications, but prohibitively expensive in relational databases. Imagine a genealogy database that stores census records and information about family trees. Each person would likely be represented as an object in a relation, and that person would have a set of two biological parents. Since the number of children a person has can vary, the children of a person are simply not stored in the same record or in accordance with another solution a large number of slots are allocated in order to accommodate (possibly) many children. In most cases where a person has an average or less number of children most of the slots would be empty. The first solution (not storing children) would be good in terms of database size, since one can tell person A's children by seeing who has person A as a parent The second option (having many mostly empty children slots) makes searching for children quicker, but at the expense of disk space (and database size).

Using this genealogy database, try to find "All of George Washington's living descendents." First George Washington is found in the database, hopefully very quickly, and figure out who his children were. Then his children's records are searched in order to find out who their children were. Third type of search is continued, again and again, repeatedly inspecting data (the tree is rebuild from the woodpile). Every time the net generation is encountered the problem requires an expensive join, or difficult successive query rewrites. The resulting living descendents are eventually obtained after significant work and many I/O operations.

With the popular available indexes for relational databases (e.g. B-trees, hash tables, inverted lists), searching for XML paths will always be difficult because the document structure is lost in the translation to relations. Every significant new document format requires a new relation. And in order to search this new type of relation, the database administrator must come in and explicitly create new indexes.

A relational mapping of XML into a database is not the only possibility. It is also feasible to map XML data to objects in an object-oriented (OO) database management system. There are clear reasons to store and search semi-structured sources using the relatively ineffective mechanisms available in relational systems over object-oriented databases in many instances. There are also reasons to favor OO databases over their relational counterparts.

In choosing an OO solution, there is significant overhead associated with storing the data. First, XML data elements must be tagged with unique object identifiers ("OIDs") so that they can be later found in the database. This overhead can swell the size of the data. This increase in size occurs well before any indexes to aid search are built. Once indexes are built to aid the search, the OO solution requires even more space.

Furthermore, OO databases generally use index structures that are quite suitable for relational systems, and support relational style queries. B-trees and hash tables and inverted lists are commonly used to index the data in OO databases. As such, even though the structured data may be stored easily, querying the data suffers the identical problems of relational system. B-trees quickly become quite large and unwieldy. Hash tables prevent range queries. Data relationships are not captured by the indexes. Thus, OO databases, as they currently stand, are not an adequate solution for storing XML data As organizations trade increasing amounts of information, the number of data formats that must be understood grows unfettered Existing database solutions do not scale well to meet this demand. When dealing with semi-structured data, it is important to be able to map and maintain the relationships present in the data. Bunernan, Fan, and Weinstein note in "Query Optimization for Semi-structured Data using Path Constraints in a Deterministic Data Model" that paths represent important semantic clues about semi-structured data If these clues are lost or not easily accessible because of the database and its indexes, the database has failed in its tasks.

There are more tasks for an effective database and indexing system for searching and storing semi-structured date Simple text searches are required of any relational and semi-structured database. The ability to do path searches is an important additional burden placed on semi-structured databases. A path search is especially useful when the sought type of data is known, but not exactly where it is in the database. For instance, a query like "find all addresses of all buyers of all invoices" is a search for the path "invoice→buyer→address." The example of this type of path is illustrated in FIG. 2. In addition to searching for particular paths, one should be able to search for particular structures within the semi-structured data, like a complete set of "buyer" information, which includes the buyer's name and address.

Finally, since the data is semi-structured, and its onion is not always known, the ability to "browse" the data is also important. When browsing the data, users hop from elements to children, or back to an element's parent it is a way to "wander" through the data in a database. Looking again at the document in FIG. 1, once the user is at "Invoice," she can see that there are "Buyers," "Sellers" "Numbers," and "ItemLists" available. The user can then follow one of these branches, say "Buyer," to find that "Buyers," have "Name" and "Address" fields associated with them.

The requisite task set for effectively indexing and searching semi-structured data is significantly larger than for structured data sources. Quite simply, the lack of a schema makes the problem much harder than before. Our proposed structures and techniques solve the problems and overcome the new burdens presented by XML and other forms of semi-structured data.

There is accordingly a need in the art to provide for a technique that facilitates encoding of semi-structured data which facilitates indexing of the data for efficient search.

There is another need in the art to provide for a technique of the kind specified that is particularly useful for indexing and searching Markup Language (ML) data in general and extensible Markup Language in particular.

There is still another need in the art to provide a technique which facilitates text search, path search, and browsing in semi-structured data in general and ML data in particular.

SUMMARY OF THE INVENTION

In the context of the invention efficient access means the ability to locate relevant data in a short amount of time or with only a small number (e.g., several) disk accesses, even though the data items stored may number in the millions or more, or even though the total size of the data items is such that they cannot all fit in the memory available to the search process. Efficient access refers to the overall or typical behavior of the system. In other words, while individual accesses may sometimes be inefficient, tie access behavior observed over time is efficient.

As is well known, semi-structured data includes as an instance the Markup Languages. The Markup languages include numerous instances including but not limited to LaTeX, TeX, RDF, SVG, SML, XCML, XML, XHTML, SGML, HTML, VRML, DHTML, VML, JAML, QAML, DML, MRML, SSML, ThML, TDML, OML, CKML, STML, PHML, CML, DCML, CFML, PGML, MGML, CellML, AnatML, FieldML, XGMML.

For convenience of explanation only the invention is described with reference to XML. Those versed in the art will readily appreciate tat the invention is, likewise, applicable to other instances of Markup Language; and more generally to any semi-structured data.

The invention provides for a method for encoding semi-structured data, comprising:

a) Providing a semi-structured data input;

b) obtaining an encoded semi-structured data by selectively encoding at least part of said semi-structured data into strings of arbitrary length in a way that (i) maintains non-structural and structural information associated with the semi-structured data, and (ii) the so encoded semi-structure data can be indexed for efficient access.

The invention further provides for a method for constructing a metadata dictionary in respect of semi-structured data, comprising:

a) providing a semi-structured data input;

b) constructing a mesa dictionary that facilitates compressed encoding of at least part of said semi-structured data into strings of arbitrary length in a way that at least maintains non-structural and structural information associated with the semi-structured data.

Still further, the invention provides for a method for encoding and indexing semi-structured data, comprising:

a) providing a semi-structured data input;

b) obtaining an encoded semi-structured data by selectively encoding at least part of said semi-structured data into strings of arbitrary length in a way that (i) maintains non-structural and structural information associated with the semi-structured data;

c) indexing the encoded semi-structured data using layered index; the layered index includes basic partitioned index structure; said layered index maintains a balanced structure of blocks.

The invention further provides for a method for encoding and indexing Markup Language (ML) data, comprising:

a) providing an ML data input b) obtaining an encoded ML data by selectively encoding at least part of said ML data into strings of arbitrary length in a way that (i) main s non-structural and structural information associated with tie semi-structured data;

c) indexing the encoded semi-structured data using layered index; the layered index includes basic partitioned index suture; said layered index maintains a balanced structure of blocks.

Yet further, the invention provides for a method for encoding and indexing semi-structured data, comprising:

(a) providing a semi-structural data input;

(b) selectively encoding at least part of said semi-structured data into keys of arbitrary length in a way that (i) maintains non-structural and structural information associated with the semi-structured data;

c) creating a balanced index structure over the arbitrary-lengthed keys.

The invention further provides for a method for indexing semi-structured data, comprising:

(a) providing a semi-structured data tint that include data items;

(b) indexing keys of the data items of the said semi-structured data such that with about no more than 25,000 bytes of internal memory per 1 million data items it is possible to locate an address of any such said data item with no more than 2 I/Os, irrespective of the size of the key.

The invention provides for a method for indexing markup language (ML) data, comprising:

(a) providing an ML data input that include data items;

(b) indexing keys of the data items of the said ML data such that with about no more than 25,000 bytes of internal memory per 1 million data items it is possible to locate an address of any such said data item with no more than 2 I/Os, irrespective of the size of the key.

A system for encoding semi-structured data, comprising:

storage for storing a semi-structured data input;

processor node configured to construct an encoded semi-structured data by selectively encoding at least part of said semi-structured data into strings of arbitrary length in a way that (i) maintains non-structural and structural information associated with the semi-structured data, and (ii) the so encoded semi-structured data can be indexed for efficient access.

The invention provides for a system for encoding and indexing semi-structured data, comprising:

storage for storing a semi-structured data input;

processor node configured to construct an encoded semi-structured data by selectively encoding at least part of said semi-structured data into strings of arbitrary length in a way that (i) maintains non-structural and structural information associated with the semi-structured data;

processor node configured to construct an indexing e-of the encoded semi-structured data using layered index;

the layered index includes basic partitioned index structure; said layered index maintains a balanced structure of blocks.

The invention further provides for a system for encoding and indexing Markup Language (ML) data, comprising:

storage for storing an ML data input;

processor node configured to construct an encoded ML data by selectively encoding at least part of said ML data into strings of arbitrary length in a way that (i) maintains non-structral and structural information associated with the semi-structured data;

processor node configured to construct an indexing of the encoded semi-structured data using layered index; the layered index includes basic partitioned index structure; said layered index maintains a balanced structure of blocks.

Yet further, the invention provides for a system for encoding and indexing semi-structured data, comprising:

storage for storing a semi-structured data input;

processor node configured to selectively encoding at least part of said semi-structured data into keys of arbitrary length in a way that (i) maintains non-structural and structural information associated with the semi-structured data;

processor node configured to creating a balanced index structure over the arbitrary-length keys.

The invention provides for a storage medium storing data indicative of encoded semi-structured data that includes strings of arbitrary length that (i) maintains non-structural and structural information associated with the semi-structured data, and (ii) the so encoded semi-structured data can be indexed for efficient access.

The invention first provides for in a computer system having a storage medium of at last an internal memory and an external memory;

a data structure that includes an index over the keys of the data items; the index is arranged in blocks, such that with about no more than 25,000 bytes of internal memory per 1 million data items it is possible to locate an address of any such said data item with no more than 2 I/Os access to the external memory, irrespective of the size of the key.

BRIEF DESCRIPTION OF THE DRAWINGS

For a better understanding, the invention will now be described, by way of example only, with reference to the accompanying drawings, in which:

FIG. 1 illustrates an example XML document;

FIG. 6 illustrates the resulting encoded strings of arbitrary length in accordance with an example of a preferred embodiment of the invention;

DESCRIPTION OF PREFERRED EMBODIMENTS

XML documents are tree structures, with both sibling and parent-child relationships. Child nodes represent subordinate relationships. Part-child relationships (aka "subordinate") are illustrated in the XML data (10—referred to also as XML document) of FIG. 1. The Name tag and Address tag are the children of Buyer tag; the Name tag and Address tag are also siblings. ItemList is the parent of tree Item children and, as shown, Item tags are "subordinated to" the ItemList tag. The code of FIG. 1 will serve as an example for explaining the underlying concepts of the invention.

Figure 2:
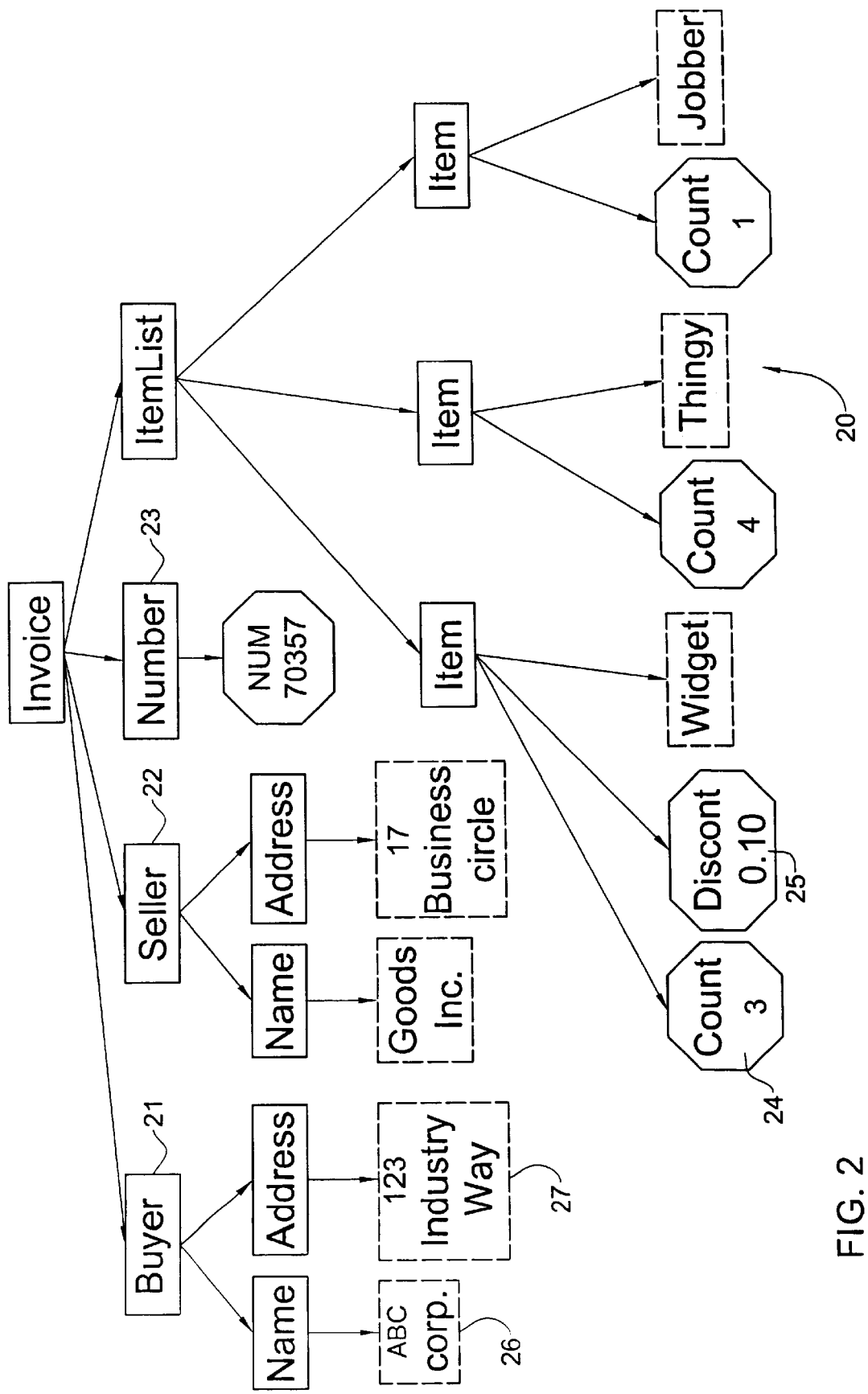
FIG. 2 is an intermediate tree representation of the XML document of FIG. 1, in accordance wit the prior art.

The sample XML document in FIG. 1 represents a tree. The responding intermediate tree (20) is illustrated in FIG. 2. tags (e.g. Buyer, Seller and Number 21 to 23, respectively) are stored in boxes with solid outlines, attributes (e.g. Count, Discount 24 and 25, respectively) are stored in octagons, and data items associated wit tags ("labels" such as ABC Corp. and 123 Industry Way, 26 and 27, respectively) are stored in boxes with dashed outlines. FIG. 2 shows all XML attributes as equivalent The attributes and their associated properties will be discussed later in the document.

The intermediate tree (20) in FIG. 2 is built from the XML document (10) in FIG. 1, by performing the following steps:

1. All tags are represented as solid boxes, with their tag name appearing in the box.
2. All text data appearing within a tag appears as a child, and is surrounded with a dashed box.
3. All attributes of a tag appear in a solid hexagon.
4. All nested tags are represented as children. For each child of a tag, steps 1–3 are repeated for the child.

In accordance with the invention, a metadata diction is built In the following a specific embodiment thereof a token dictionary is described The invention is not bound by this specific example of metadata dictionary.

In accordance with this preferred embodiment tokens are used to encode XML components such as, in a preferred embodiment tags and attributes. By this preferred embodiment a token dictionary is a collection of tags and attributes and their associated tokens. By a simplified analogy, in an English Dictionary, words are defined by their entries and the token dictionary tags are defined by their entries. Each tag type indexed corresponds to one or more tokens in the token dictionary. The sate applies to attributes.

As will be shown later, the token dictionary enables not only the encoding of the XML data elements into stings, but also provides a first level of compression in that the so encoded strings will be shorter than their counterpart XML elements.

Next, as a preparatory stop for the subsequent indexing, the intermediate tree structure of FIG. 2 is mapped to a tree where tags and attributes are replaced by tokens, using, to this end, the toke dictionary.

Thus, as a first stage the document (or part of the document) is inspected to make note of the tag types that appear in the document. During the document encoding process, XML tags are replaced with tokens. Tokens are a short pattern that represents the tag. For instance, the tag type Invoice can be represented as the much shorter tag A. The token B could represent the tag Buyer. Seller could be token C, Number could be D, and so on. The short representation facilitates the compression discussed above.

Before assigning a new token to a tag type, reference is made to a token dictionary. This token dictionary works for illustrative purposes like a typical English dictionary in tat it stores words and their meanings. By this preferred embodiment the token dictionary stores tags and their tokens. Some words in the token dictionary, just like English words, may have multiple meanings. This overloading of entries in the token dictionary serves an important purpose, especially in relationship to XML attributes.

Attributes are part of tags, but not part of a tags label and not a proper child. Like a child, however, attributes are subordinated to their parent tag. However, this fact alone does not demand special treatment when indexing. When considering Indexing (as will be discussed in more detail below) problems may arise when attributes have the same name as tags. For instance, this is an XML tag where the tag type (name) and attribute type (name) are identical:

<name name="partOfAttribute">partOfTag</name>

To avoid confusion when searching an XML document the token dictionary, by this embodiment, would contain two entries for "name," one for when it is used as a tag type, and one for when it is used as an attribute type. This in certain respects is similar to an English dictionary that has multiple entries for words that can be used as different parts of speech.

In accordance with another preferred embodiment this idea can be further extended to semantic distinctions. Users could attach different meanings to like terms in the token dictionary. Such semantic distinctions that are introduced to the dictionary can be utilized by semantic reasoning engines (which do not form part of the invention) in order to determine the semantic meaning of the specified terms (e,g., for determining that the tag Jaguar is referencing a type of car and not a type of feline). Of course, the default automated behavior of the token dictionary only distinguishes between tags and attributes and does not provide the pertinent semantic analysis. However, without the token dictionary, this sort of tagging is not practical. Even with structural annotations, relational indexes such as inverted lists do not support this idea.

Figure 3:
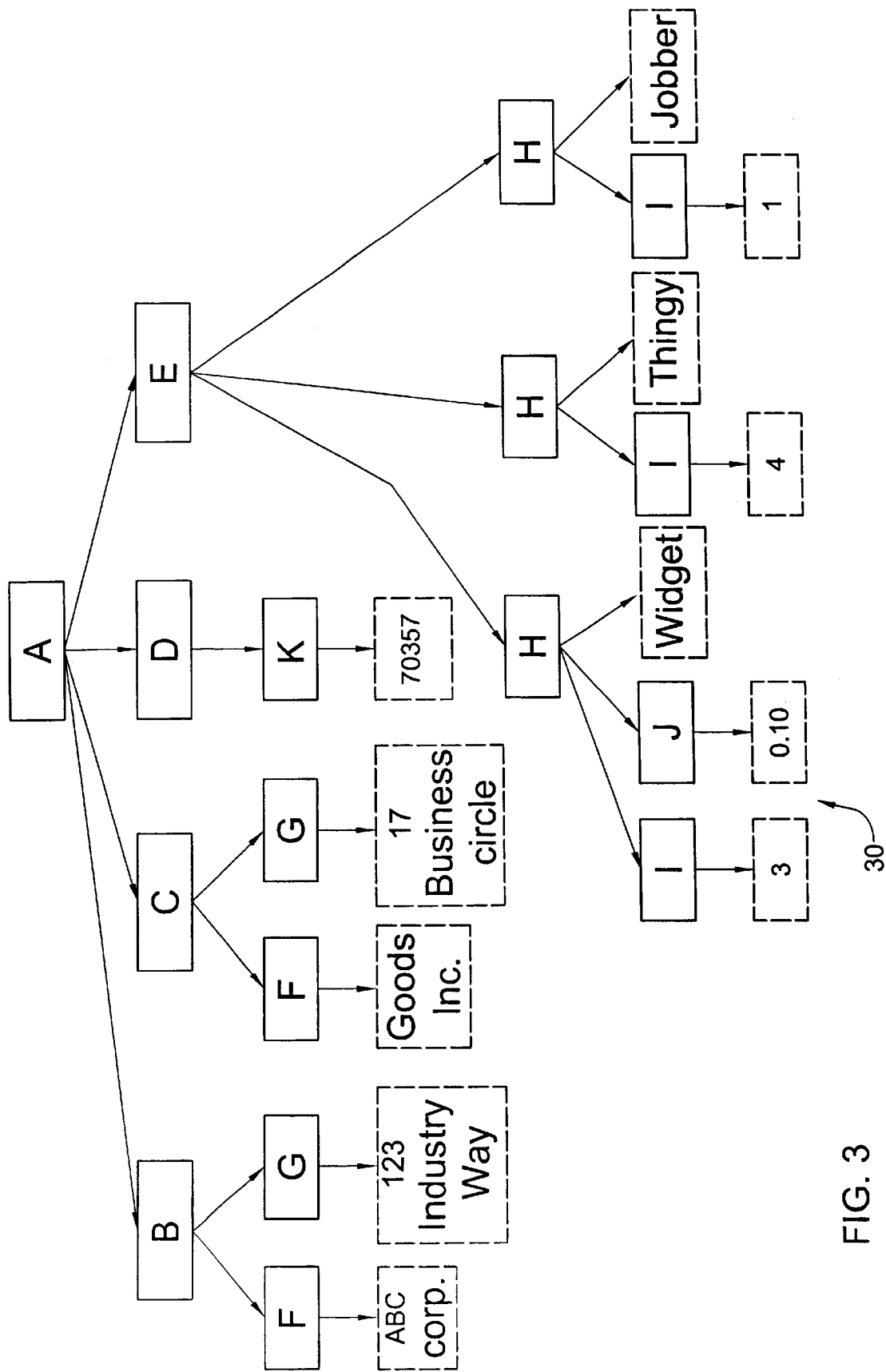
FIG. 3 is an intermediate tree representation of the, XML document of FIG. 1, where tags and attributes are replaced by tokens, in accordance with a preferred embodiment of the invention.
Figures 4, 5:
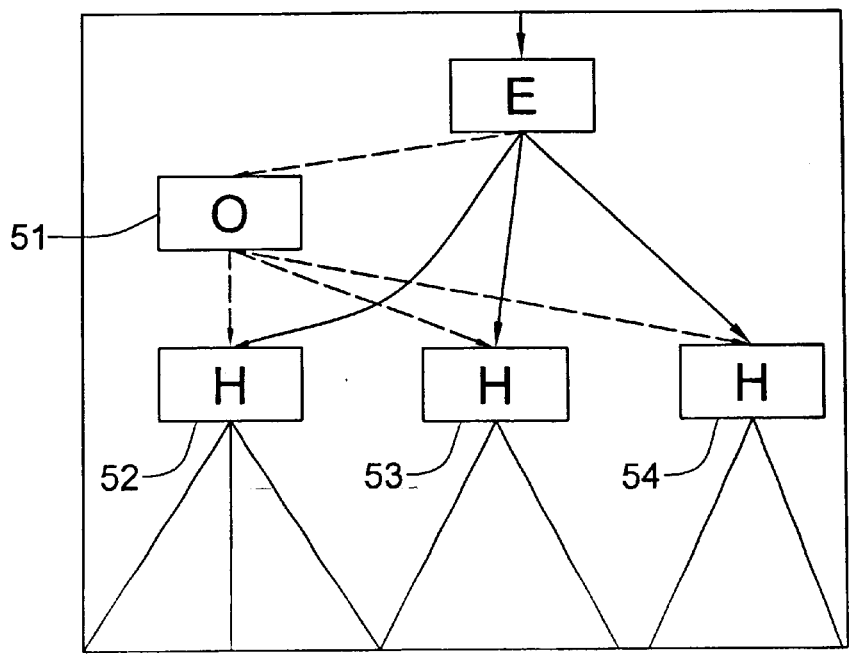
FIG. 4 illustrates an exemplary token dictionary that is utilized in the process of encoding strings of arbitrary length, in accordance wit a preferred embodiment of the invention.
FIG. 5 is an intermediate tree representation of FIG. 3 with a special token for preserving ordinal information, in accordance with an example of a preferred embodiment of the invention.

There are potentially numerous representations of the token dictionary that would be created for the XML document (10) shown in FIG. 1 (and the corresponding intermediate tree (20) shown in FIG. 2). One such representation (30) is shown in FIG. 4. Tis token dictionary has a single entry for each XML tag or attribute. For example, the entry for "Invoice" in the dictionary corresponds to the token "A." These mappings are used to generate the sample XML tree seen in FIG. 3.

The construction of the Token dictionary (40) of FIG. 4 involves by one embodiment the following steps: each tag or attribute is assigned with a token from the dictionary. If a tag type does not appear in the dictionary, a new token is created. After replacing all tags and attributes with tokens from the token dictionary, the XML intermediate tree (30) looks like FIG. 3. It may seem that the tree in FIG. 3 is not the same as the tree FIG. 2. The difference comes when the attributes are turned into token/label pairs.

In the tree (30) of FIG. 3, tokens have replaced the tag and attribute types. Once the tokens have replaced the tag and attribute types, the new document is almost ready to be indexed. The only remaining caveat is the notion of order among document siblings.

In accordance with one embodiment, the entire process that transforms the XML tree representation (20) in FIG. 2 into the XML tree representation (30) in FIG. 3 can be summarized as follows:

1. All attributes (e.g. Count, Discount 24 and 25, respectively) are changed from octagons to solid boxes that contain the attribute name with a subordinate dashed child box that contains the attribute value.
2. All values in solid boxes (e.g. Buyer, Seller and Number 21 to 23, respectively) are replaced with the appropriate tokens from the token dictionary.

Note that this entire encoding process (i.e. from the XML of FIG. 1 to the tree representations of FIGS. 2 and 3) is automated and not necessarily visible to human operators. It should be further noted that the process does not have to be completed to this level of detail e.g. with varying boxes and line styles to represent the different parts of an XML document. This level of detail is shown for clarity of explanation. In general, the input XML document is represented as tree structure with tags and attributes replaced by tokens. The resulting data structure can be stored and indexed, as will be explained in greater detail below.

Before proceeding further to describe the remaining step of creating the encoded strings of arbitrary length, there follows a short discussion about the notion of sibling order. The idea of "order" (ordinal information) is very important for some documents, and not at all for others. For example, in research papers, the "first author" is generally credited with the lion's share of the project effort. On the other hand, given a grocery receipt on which "carrots" appear before "corn," order carries little significance.

Thus, in accordance with a preferred embodiment of the invention, sibling order is represented through a special application of tokens. Other approaches annotate objects (data items) with their "ordinal number" or use explicit pointers of some sort for object chaining. This heavy handed approach requires that the index structure is aware of order, and deals with order in a different manner from other properties. This increases the complexity of the storage mechanism, but does not lend any unique advantage. The main problem with these other approaches is that they impose restrictions on the indexing and storage mechanisms. A generalized representation should not be restricted to specific implementations. As will be explained below, a better approach is to use the explicit sibling order in the document as an implicit tag.

In accordance with this specific embodiment, there is a special token (say, "O" (51) in FIG. 5 below) in the dictionary that is never used to represent an explicit tag type or an attribute type. This token is only used to represent sibling order. In FIG. 1 there are three Items: widget, thingy, and jobber (in that order). In a general data structure, such as a trie or the Layered Index, objects are ordered lexicographically. In this case, the trie or the Layered Index would store the objects in the following order: jobber, thingy, widget. This is the precise opposite of the order these objects appeared in the original document: widget, thingy, jobber. To solve this problem, without imposing a restriction on the search and storage mechanism, the sibling order is represented as its own token (O).

FIG. 5 shows where a special token would be leveraged to preserve order. The O tag (51) represents a token that did not explicitly exist in the original document, even though the order was explicitly present (In other words, the order of widget, thingy, and jobber is evident from the original document). The edges (52, 53 and 54) of the O tag are labeled (say, with ordinal number in ascending order that corresponds to the ordered items widget, thingy, and jobber, respectively) and thereafter indexed Whereas with the "O" token explicit sibling order is represented, the invention is not bound by this specific form of order. Accordingly, if desired a different token (not shown) can represent non-explicit sibling order, say the reverse order (e.g. jobber, thingy, widget).

The method described above is quite effective at supporting arbitrary queries, where users do not even need to know the data types present in the database before starting a search. In cases where there is foreknowledge about the queries that will be run over the database, even better performance can be achieved.

Thus, in accordance with a modified embodiment an encoding scheme (referred to as the "smart path") is implemented. By this approach, when there are identifiable queries that appear more frequently than others, or some set of queries that represent all possible queries for a given data set, there is no need to store the full set of details and in particular the full path that corresponds to the specified query. Hence, instead of indexing the full (raw) paths, the corresponding (short) smart paths are indexed. The short path (rather than he explicit original path) is, thus, non-explicit. If addition, or alternatively, smart paths may include paths that are completely non-existent in the original data.

For example, consider the invoice document shown in FIG. 1. If users will never look for the "Invoice→Seller" path, there is no reason to encode and index that path. This might be the case when the only invoices appearing in a department's database have that department as the "Seller." Regardless of the reason, there are times when only parts of the data set are interesting to potential Assume that one important query type simply looks for items sold, without regard to buyer, seller, invoice number, etc. This type of query might be important to a group performing an inventory analysis. Based on the paths in FIG. 2, the interesting path is "Invoice→ItemList→Item." In most known indexing schemes this path represents three steps in the index.

In accordance with the present modified embodiment, instead of indexing the path "Invoice→ItemList→Item" (explicit in the document) to identify an "Item" in the database, a "smart" path (non-explicit) called "SmartItem" (or any name) is indexed. At the end of the "SmartItem" paths would be the same data that was at the end of the original "Invoice→ItemList→Item paths." Of course, the descriptive name "SmartItem" would be replaced by an entry from the designator dictionary, say "X." When performing the lookup for "Invoice" in the token dictionary, all smart paths that begin with "Invoice" are found.

Using smart path indexing can save considerable space in the index (if it replaces the original raw index). It is important to note that path indexes do not influence the storage of the original data. Techniques that do not alter the original data are certainly preferred to those that affect the data. By leaving the original data pristine, multiple indexes can be built (including, if desired, multiple paths that lead to the same data item), or data can be used for other tasks, all without translation back into the original format. Additionally, it requires less effort if an index can be built without costly data transformations.

Smart paths are but one additional way to leverage the proposed techniques to provide enhanced performance under specific conditions. By coupling the token dictionary with techniques designed to capture the relationships inherent in semi-structured data, many indexing possibilities arise. When using one of these alternate encoding methods, like smart paths, the index always achieves better performance than a full index (as discussed in detail above), but can only support a portion of the space of possible queries. This tradeoff can be used to achieve an optimal balance somewhere in between the basic implementation (useful to ad hoc and less frequent queries) and smart paths (useful to predefined and frequently asked queries), or can even be used to couple different approaches in tandem. There is no limit to the encoding technique, only certain practical limits imposed by the available hardware of the day.

The various preferred embodiments described above are only instances of the more general concept of representing semi-structured data as data strings of arbitrary length. In accordance with die proposed approach, the encoding technique can represent semi-structured data as string information, where some of the information comes directly from the original data and some of the information comes from the token dictionary. As will be shown in greater detail below, indexes can be built using those stings, and those indexes can achieve much better performance than traditional indexes. The encoding maintains the structural (specific examples are the path information and sibling order information) and non-structural information.

In this context the term "structural" as used in the phrase "structural information," refers to how objects or data items are related to one another. There are many properties and relationships that fall into the category of "structural." Relationships between objects, such as parent-child relationships, are structural information. Element ordering among sibling objects is also structural. Paths formed by relationships between multiple objects are also structural. These examples give an indication of what composes structural information. In terms of XML data specifically, structural components include markup ("tags"), properties ("attributes"), and relationships such as element nesting and sibling ordering, as well as paths formed by such relationships.

Non-structural "Non-structural" is easily defined in terms of its counterpart, "structural." "Objects" or "data" generally represent non-structural information. Objects are related in certain ways, and their relationships combine with the objects themselves to form complete documents. In terms of XML data specifically, non-structural components include the content that appears between the markup tags.

In a string encoding of XML, concatenating stings captures i.a. parent-child relationships. Using the data in the Token dictionary of FIG. 4, one possible conversion of the XML into stings of arbitrary length is shown in FIG. 6.

To generate the contents (60) of FIG. 6, all the paths from the root of the XML tree (shown in FIG. 3) are written in the "XML path" column. Then, the arrows from parents to children are erased, and the resulting strings are written at the corresponding locations in the "XML path string" column.

This is but one possible representation of the XML as strings. There are many different possibilities. For instance, in accordance with one preferred embodiment when the XML has labels at nay levels in the tree, not just at the leaves, the tokens (as in FIG. 6) may be prefixed. In accordance with another preferred embodiment an infix notation is used, distributing the tokens among the labels in the strings. By another preferred embodiment that handles arbitrary collections of strings efficiently, both approaches (infix and prefix string encoding) have distinct advantages.

In those embodiments in which element ordering is significant, the solution that provides storage of ordinal information (discussed above, e.g. using the O token) can be used. If desired, the use of the order sensitive solution (egg. with the O designator) to represent order can be the default behavior of the index. It should be noted, however, tat there are data sets for which it provides no benefit. It appears, thus, that the database administrator is the best arbiter for the decision to store ordinal information in the index.

The string of arbitrary length maintains the structural information including the path (explicit and non-explicit, say, in the case of smart paths).

Whereas the string of arbitrary length (see, e.g. the strings entries 62 and 63, being of different length) are in compressed form (since the original longer tags and tokens were encoded by shorter tokens), this is not necessarily always the case and thus other encodings that do not necessarily achieve compression may be used, depending upon the particular application.

It should, likewise, be noted whereas the description above illustrated the encoding through the use of intermediate trees (FIGS. 2 and 3), the invention is by no means bound by this specific route, and other implementations that receive as an input an XML data or representation thereof and encode it (or part thereof) into stings of arbitrary length are applicable.

Having encoded the data it can now be indexed to facilitate efficient access. The access will enable i.a. content based access and structure-based access to thereby afford searching browsing and other operations.

There follows now a description for a specific embodiment of indexing utilizing a designated index, preferably a layered index Layered index and designated index are discussed in detail in U.S. Pat. No. 6,175,835.

The Layered Index structure is particularly well suited to indexing and searching XML. Coupling our techniques for tokenizing XML with the Layered Index structure yields performance results and system properties not attainable in other implementations.

Since the Layered Index is an index and not a complete DBMS implementation, it can exist above standard implementations and provide enhanced query performance. At the same time, the Layered Index can leverage the facilities provided by the database below it. For example, there is a system called STORED (Semi-structured TO Relational Data) that discovers ways to bulk load semi-structured data into a relational database in an efficient manner (see: "Storing Semi-structured Data with STORED," by Deutsch, et al.). The STORED system is very good for an a priori load analysis, and generates relations that are designed for good performance under various conditions (such as a given query mix or an allowable amount of wasted space). The Layered index can sit atop a relational system like STORED, leverage its myriad strengths, and simultaneously overcome many of its shortcomings because of its relational nature.

The Layered Index can be browsed, searched by structure, and has other advantages that a relational system like STORED does not supply. Additionally, the Layered Index fits in main memory for millions of objects, and usually requires only one I/O to search and update within billions of objects. This is a clear performance gain that is not approached by relational systems. By coupling the two, the Layered Index gains from the database beneath it, while the database gains from the Layered Index. For XML, the performance gains from the Layered Index are substantial.

This decoupling of the index from the primary storage system means hat deficiencies in the storage system can also be overcome at the index layer, before penalties are paid at the data storage layer. For example, STORED remains efficient at some points by storing nonconforming data items in "overflow buckets." These buckets are expensive to search in the storage layer, but are used because they can save significant space, or reduce the number of required tables, By tokenizing the XML and indexing it with the Layered Index, the complete structure of the XML forced into overflow buckets by STORED still appears in the index and thus, can be searched efficiently. No information is lost because of the storage mechanism.

Another advantage of this decoupling is that the Layered Index can grow arbitrarily without suffering performance penalties present in the storage system below it. STORED is an effective mechanism for pushing semi-structured data into a relational database because it can see all the XML data at load time. What happens when new data is added to a STORED database that does not conform to the data initial used to construct the database? The advantages of using STORED are incrementally diminished with each new nonconforming XML document. The Layered Index suffers no such penalty. In fact, as the population of XML documents increases, the PATRICIA structure at the foundation of the Layered Index becomes more accurate.

In relational systems, there is a trade-off between effective indexing and efficient storage size, which is a tradeoff the Layered Index does not have to make. Since the Layered Index stores (by one embodiment) PATRICIAs that are a structure fundamentally related to an XML tree, the precise amount of information needed for complete indexing is stored. With a relational table, sparse data is fundamentally wasteful to store (because of null values); this is not the case in the Layered Index. With a relational table dense data is fundamentally wasteful to index because complete keys are indexed); this is not the case in the Layered Index.

Finally, there are advantages to indexing XML with the Layered index that cannot be realized in any complete-key indexing scheme or in a relational database that explicitly stores complete documents. The underlying PATRICIA compresses the keys in the Layered Index, such that very little space is required to index a document. The Layered Index can index an arbitrary length key in a new XML document with only a single symbol from tat key. This means the Layered Index can be maintained in main memory for millions of objects when those objects are XML. Complete key indexes, such as B-trees, grow not only with the number of objects indexed, but with the size of the index keys as well, With arbitrary XML documents, B-tee performance cannot be bound (or even estimated) in any reasonable way.

Turning now to a specific example of indexing using a layered index, U.S. Pat. No. 175,835, highlighted the usage of designators (page 25 of the patent) and subordination of data records to describe the data elements and their relationships.

By one embodiment of that patent exemplified in FIG. 13E two data records designated B (812 and 820 in the drawing) and one record designated D (824) are subordinated to data record designated A (806). A designated index allowed search over designated data record. Another embodiment deals with the creation of a layered index to allow efficient search. An example of such is shown in FIG. 7H of that patent.

The usage of designated data and subordination relationships for semi-structured data can be exemplified by a) using a set of rules and or knowledge and or formula to map the semi-structured data to designated data records where each such designated record can be a subordinated record; b) combining the designated records into stings that can represent structural and non-structural information that is either explicit or not explicit in the original data item; and c) creating a designated index in which part or all of each string is treated as a key, thereby enabling search over this set of designated records. In a preferred embodiment such index would be a layered index. The designated records being an example of data items.

Figure 7:
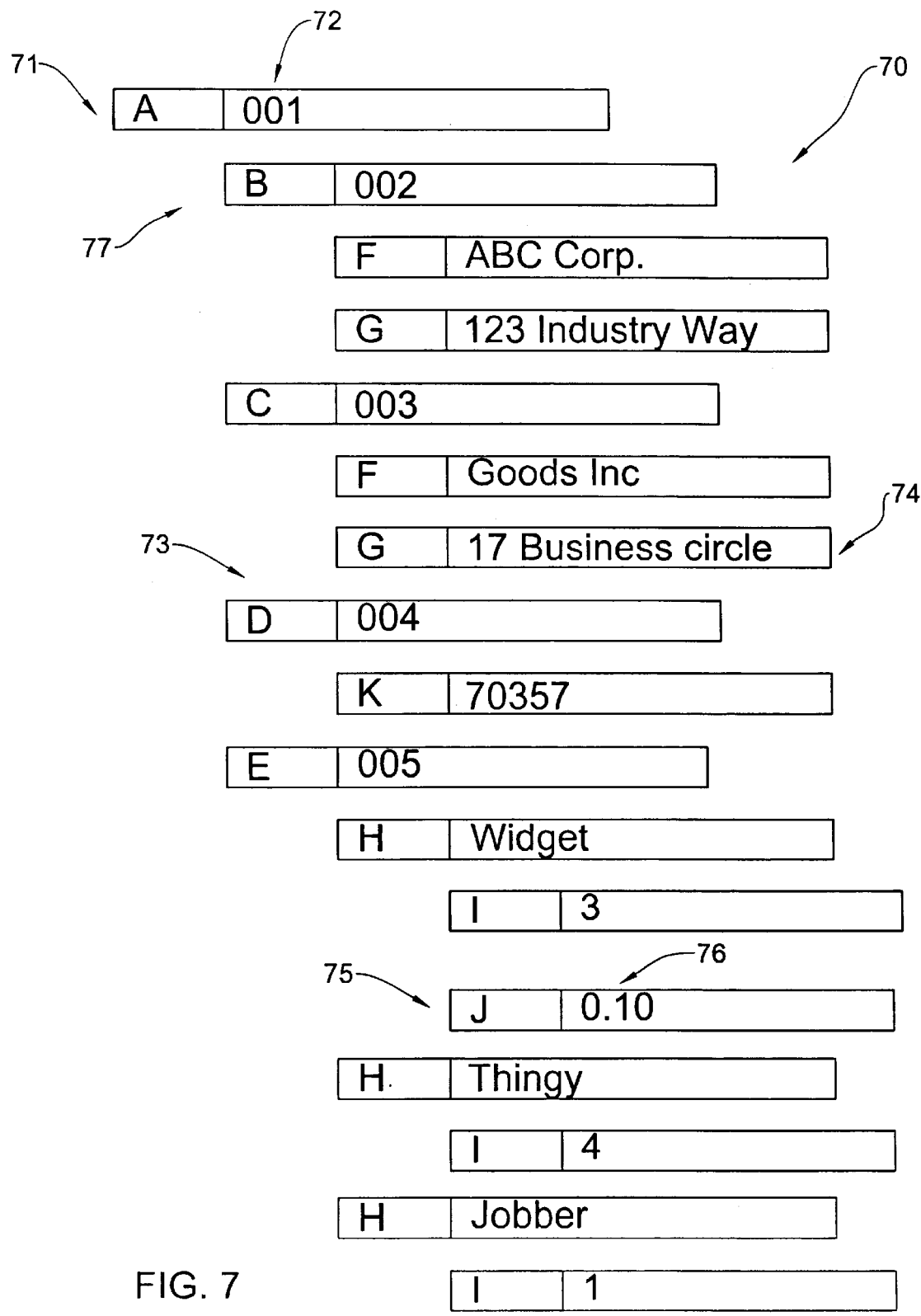
FIG. 7 illustrates the mapping result of the XML document of FIG. 1 into designated data records in accordance with a specific embodiment of the invention.

To exemplify step a) of the above, FIG. 7 shows the mapping of the XML document of FIG. 1 to designated data records (70). These records must be long enough to contain the designator and the associated information and may further be padded with extra space. To create the designated records, each tag and attribute that appears in the original document is replaced by a designator obtained from the token dictionary of FIG. 4. For tags, the created record contains the concatenation of the designator with the data that is associated with the tag. In the example of FIG. 7, the seller's <Address> was mapped to a record designated G appended with the data "17 Business Circle" (74). If the tag has no associated data, then a unique identifier is created and appended to the designator. For example, in FIG. 7, the tag Invoice was mapped to designator A (71) and appended with the identifier 001 (72) since the tag <invoice> in the XML document had no associated data. For attributes, the designated record is constructed by concatenating the designator and the attribute value (with additional optional padding). In FIG. 7, the attribute—discount—was mapped to (76) a record designated J (75) with a key that includes the discount value (0.10).

The parent-child relationships among tags and between attributes and the tags that contain them are represented by the subordination of the corresponding designated records. The subordination is derived from the hierarchical nature of the XML—in FIG. 7 for example, since <buyer> is a child of <invoice> the record designated B (77) is subordinated to the record designated A (71).

In step b), the designated records are encoded into strings of arbitrary length based on the subordination relationships or other relationships. For example, some strings that would be created from the records in FIG. 7 include, the string "A001+", "A001+B002+", and "A001+B002+FABC Corp.+", where the "+" signs represent spaces to pad each component (to a length of 100 characters). It is important to note that the padding to 100 characters is just one example, as the strings created by the mapping can be of arbitrary (possibly different) lengths.

Figure 8:
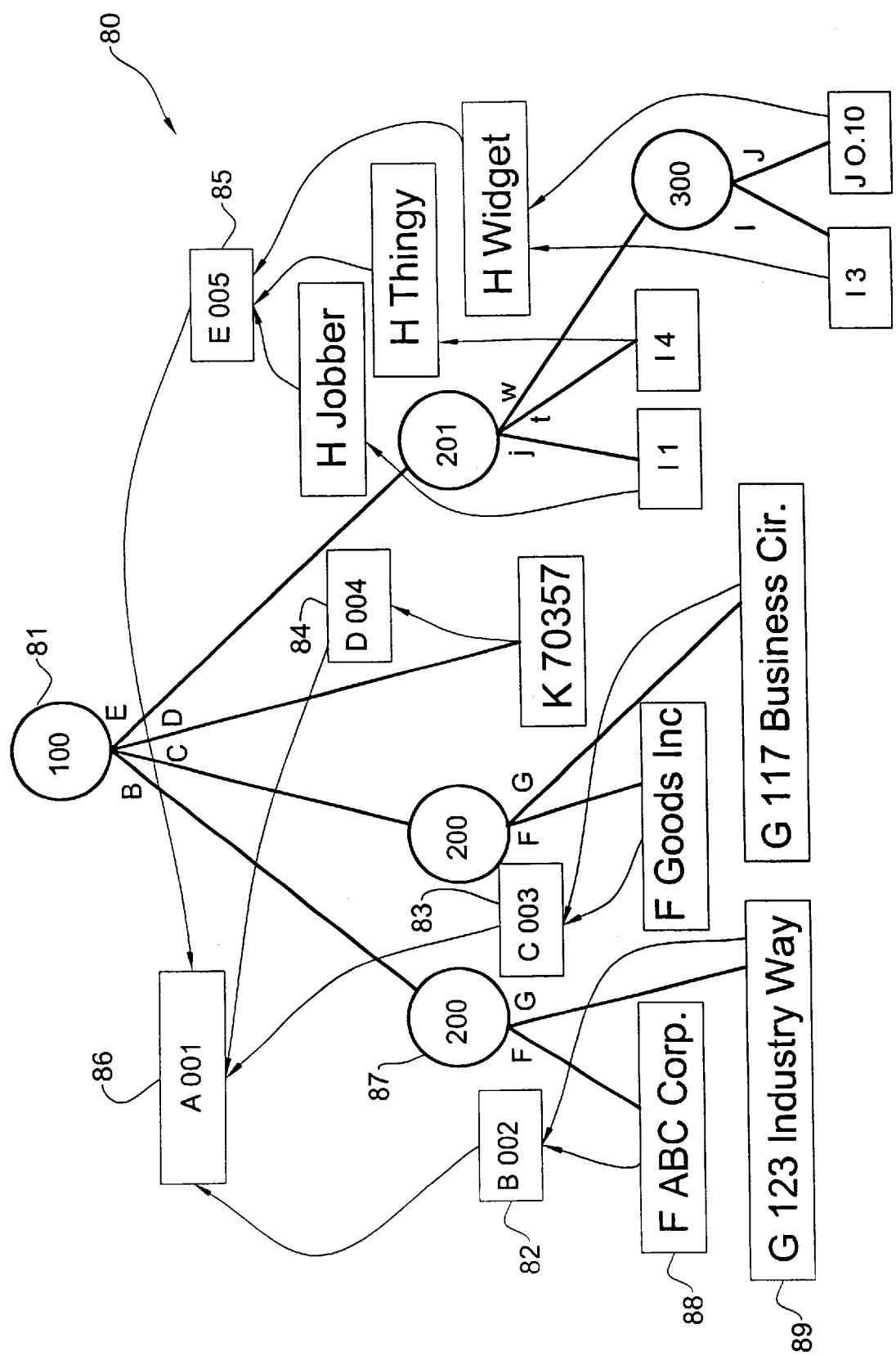
FIG. 8 illustrates a Patricia structure over designated records in accordance with a specific embodiment of tie invention.

The next step of the encoding concerns the insertion of the strings into an index. FIG. 8 shows a specific case of Patricia structure (80) over the strings obtained from the designated records of FIG. 7 in an embodiment similar to the embodiment of FIG. 13E of the above U.S. Pat. No. 6,175.835.

A Patricia structure is an index structure derived from a trie such that only nodes that have at least two children are maintained. Since the nodes with one child are compressed the nodes in a Patricia includes the differentiate key position. Because of that compression, the size of the Patricia structure might be less than the aggregate size of the keys addressed by the Patricia. For a more detailed discussion on Patricia structure see Donald E. Knuth, *The Art of Computer Programming, Volume 3/Sorting and Searching*, page 490–499. In FIG. 8, the dark circles and dark lines represent the Patricia nodes and links.

In the example of FIG. 8, the nodes address byte offsets (shown as a number within each circle), the size of the designator is assumed to be 1 byte, and the rest of the record's key fields are padded to 100 bytes as described above.

For example, the root node (81) maintains the value 100 that relates to the designator position of records B, C, D and E (82 to 85, respectively) all of them subordinated to the same A record 36. The leftmost node with the value 200 (87) relates to the designator position of records F and G ((88) and (89) respectively) that are subordinated to record designated B (82) with the key value of B002.

The arrows such as from record B002 to A001 maintain the hierarchical relationship between the records with the strings generated in step b. These links can exist in one embodiment as physical link from a child record to its parent record.

A similar example is shown as links 826, 828 and 830 in FIG. 13E of the above U.S. Pat. No. 6,175,835. FIG. 13D of the above patent exemplifies another embodiment in which each designated record (such as records 812, 820 and 824) physically includes (at least) the hierarchical key.

Figure 9:
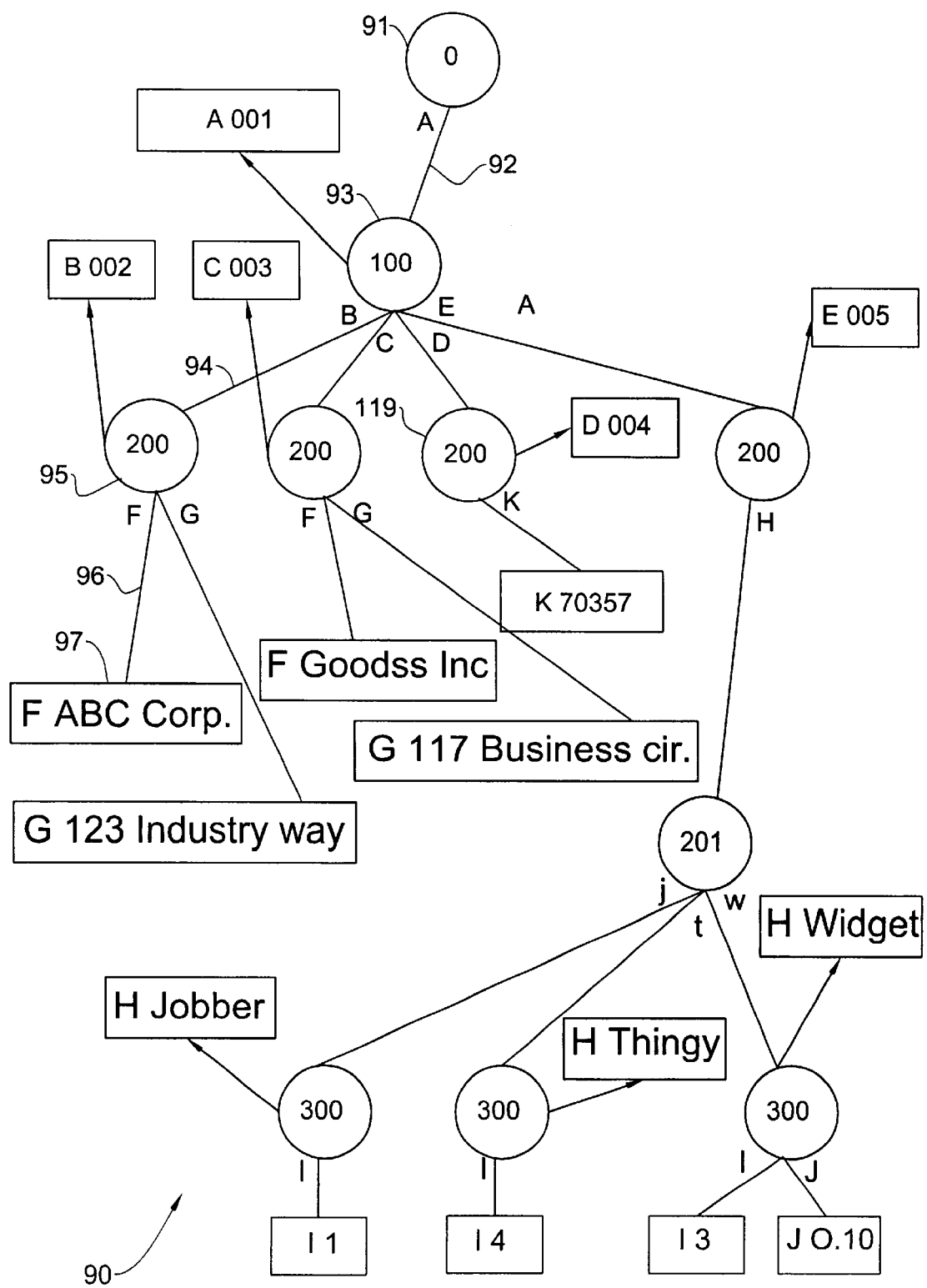
FIG. 9 illustrates the result of implicitly maintaining the designators in the index structure of FIG. 8.

FIG. 9 presents the result of implicitly maintaining the designators in the index structure of FIG. 8. The resulting structure deviates from a Patricia structure in that the structure of FIG. 9 (90) includes nodes with only one child. The (non-straight) arrowed links from a child record to its parent (such as in FIG. 8) are not shown for convenience. An alternative link from a node with a value that relates to a designator position in the key to the parent record was added as a straight arrow.

It can be easily seen that the size representing a key in this Patricia structure is smaller than the original key size. The key for the buyer name once mapped to the designated record F is a concatenated key that includes the invoice and the buyer thus being A001+B002+FABC Corp. While this key is 300 bytes long, the space needed to represent this key and its hierarchy in the Patricia structure of FIG. 9 will typically be much less. This space includes at most, the root node (91) with the value 0, the link labeled A (92) from that root to the child node having the value 100 (93), the link with the value B (94) from that node and its child node with the value 200 (95) and the link labeled F (96) from that leaf node to the data record FABC Corp (97). In a specific embodiment, a node and the links between nodes can be represented by 2 bytes each and a link to data record by 4 bytes, the 3 nodes and 3 links with extra overhead would take only 20 bytes which are less than 10% of the size of the keys making up the path.

The structure of FIG. 8 and the structure of FIG. 9 could both be made into a basic partitioned index. Since the unbalanced nature of the trie a layered index can be formed in a way described in U.S. Pat. No. 6,175,835.

Figure 10:
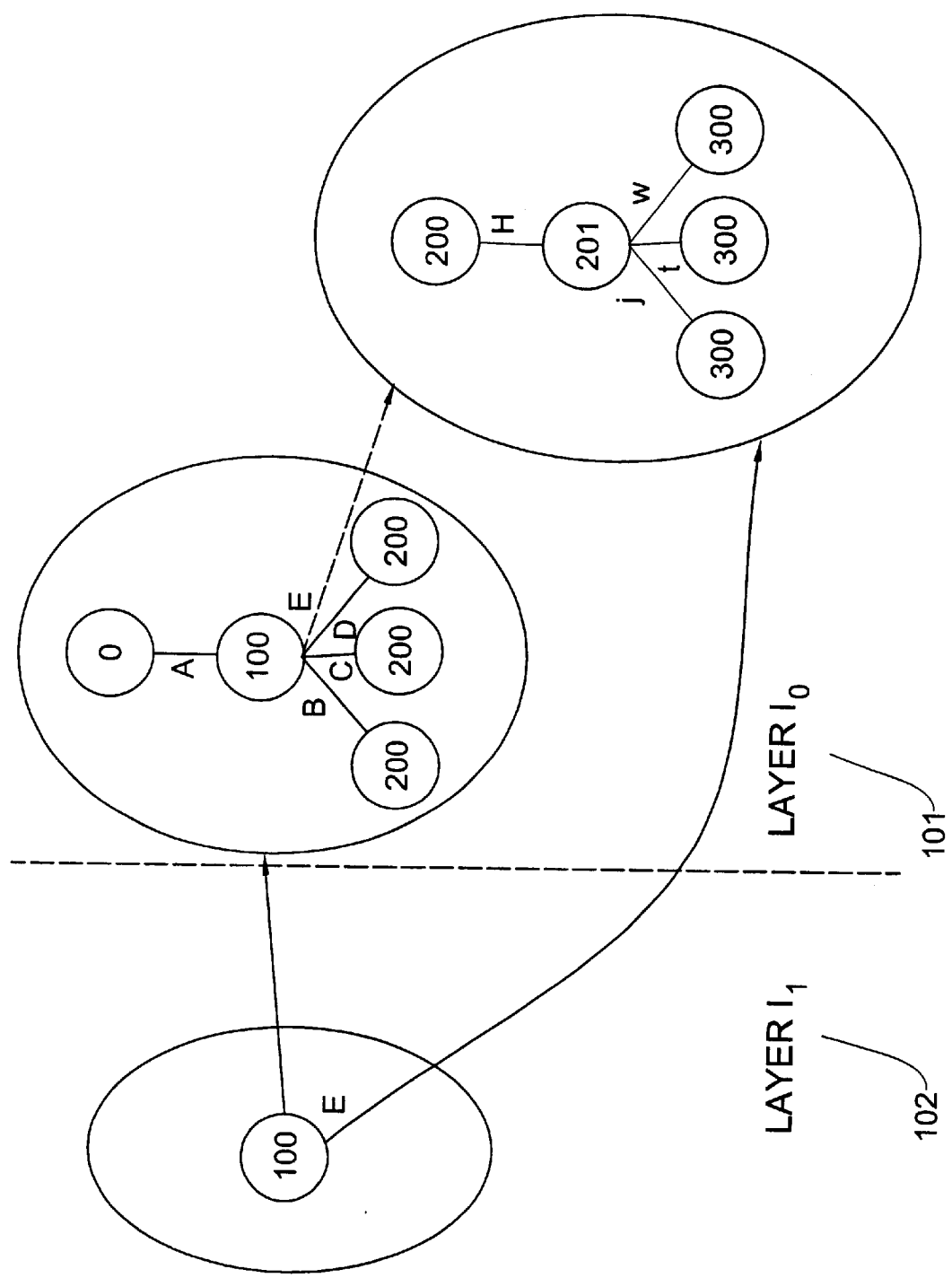
FIG. 10 illustrates the structure of FIG. 9, partitioned into blocks an additional representative index.

FIG. 10 shows the structure of FIG. 9 as a basic partitioned index ((101) in layer $I_0$, and an additional index layer (102 layer $I_1$) over the representative keys of the blocks of the layer $I_0$ constituting a representative index (the data records and the links to the data records are omitted for convenience).

Once a representative index is formed the search to the designated data records would start at layer $I_1$ (102) (and in the general case at layer $I_k$ where $I_k$ is the root index) to reach the block at $I_0$ (101) that is associated with the record whose key is searched. This would be done in a balanced manner (the additional $I_1$ to $I_k$ layers constitute a balanced structure of blocks) all as explained in the above patent.

In order to calculate how much memory is needed to maintain the non-leaf blocks of the layered index (the representative index) we will assume that every new key that is added to a Patricia structure (in $I_0$ (101)) adds about 10 bytes to the size of the Patricia (4 bytes to maintain the physical address, 1 byte for the label and some overhead).

Assuming that every block is 8K bytes in size and on the average about 70% fill, about 560 elements can be represented by a single block (8000×0.7/10). One million elements would be represented by about 1786 blocks. The representative index would index the representative keys of the 1786 blocks with again about 560 elements per block thus with about 3 blocks of 8K bytes each (about 24K bytes of memory). Thus approximating—for representing additional about 1 million elements in the index, about 25K bytes of internal memory are needed in order to maintain the additional non-leaf blocks in the internal memory. This, of course, is only an example and the invention is by no means bound by this example.

Figure 11:
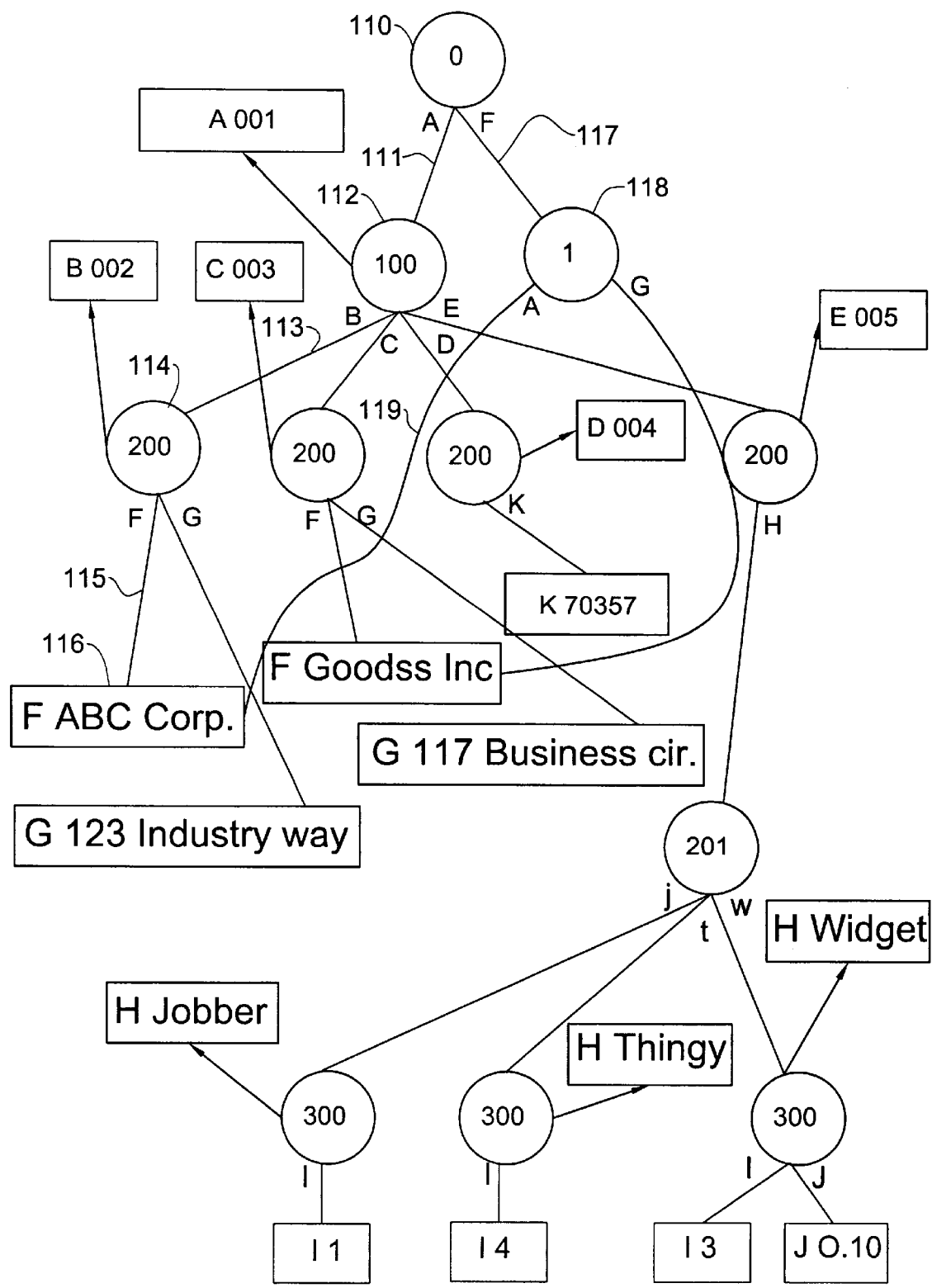
FIG. 11 exemplifies an alternative path (Smart Path) to data records representing specific parts (names) in the original XML document of FIG. 1, in accordance with one embodiment of the invention.

FIG. 11 exemplifies an alternative path (Smart Path) to data records representing names in the original XML document of FIG. 1 (i.e. [FABC Corp.] and [F Goods Inc.]) Rather than following the document structure (for example: by the key "A001+B002+FABC Corp.+") it is possible to search by the key "FABC Corp.+" since the key represented by the Smart Path is of the designator F followed by name (the path of the nodes and links—110, 117, 118, 119 to data record 116 rather than 110, 111, 112, 113, 114 and 115 to data record 116). Obviously if the information available for the search is only of the company name, this search would be more efficient than the search that follows the document structure.

Obviously other alternative path and Smart Paths are possible. Alternative paths can lead also to permutation records such as for example the one shown in FIG. 14 of U.S. Pat. No. 6,175,835.

With a layered index, the search through the unbalanced structure of the basic partitioned index structure is replaced by an essentially balanced search This is the result of adding the additional representative index to form a balanced structure of blocks (the layered index). Since an index wit three layers can address billions of data items (regardless of the size of the key) and the footprint of the first two layers is very small and could be maintained in the internal memory. This index is considered to be more efficient than alternatives that do not have both of the properties: (a) are balanced or (b) the growth of The index does not depend on the size of the key.

An additional (c) property tat further improves the efficiency is the linkage between subordinate items. In FIG. 8, if a search leads to the designated record "FABCCorp" (by the original structure or by a smart-path), its parents (the relevant B and A records) can be reached directly (by the arrowed link). In alternative approaches to (c), a search in a separate index might be needed.

An index such as in FIG. 8 supports browsing—for example, from the root node, a user would see the optional alternative links to the Buyer, Seller, Number, and ItemList (by looking at the token dictionary for the meaning of B, C, D & E respectively), and can then decide on the path to follow.

Enabling the advantages of a smaller size, potentially short search paths, and balance makes the layered index considered (among others indexes) to be more efficient than schemes that address only some of the advantages.

The proposed encoding and indexing (in particular for the layered index embodiment) has many advantages. It is a "universal index," in that it can be used for any XML data. It is a "flexible index," in that it can be simultaneously tuned for multiple access paths. It is a "small index," in that it is generally orders of magnitude smaller than data over which the index is built. It is a "fast index," in that most or all of it can reside in main memory, and may require a single I/O to address billions of data objects. In addition to these performance metrics for semi-structured sources, it still maintains excellent performance over simpler "relational" data sets.

It should be noted that an index is a useful structure because it eventually points to some information beyond itself. Frequently, index types are determined by the actual data that the index eventually points to. Traditionally, relational data is indexed by structures such as Btrees, hash tables, and inverted lists because these indexes work well with relational data. Object oriented databases tend to use some of these structures, but also lean heavily on very object oriented indexes, such as DataGuides and path dictionaries. The Layered Index approach is not restricted by the underlying data, or how that data is managed. The index we construct can easily lead users to fully structured data sources, like relational databases, or to semi-structured data sources, like object-oriented databases. This index is not constrained by the data below, and thus provides a uniform mechanism to access multiple data types simultaneously.

There follows now a short discussion in connection with improvement. Thus, after converting tags and attributes into their token representations, several opportunities for improvement are presented that are not readily realizable in the native representation. First, the index can store new compressed non-explicit paths that are not present in the original document The token encoding and use of the token dictionary means that we can leverage this ability for path compression without restricting the implementation. In FIG. 3, there are paths like A→C→F (which is the path Invoice→Seller→Name seen in FIG. 2). If A→C→F is a commonly searched path, the database administrator can make the decision to create a new token, say "M," that has the same meaning as A→C→F (whilst optionally retaining also the original path information). This effectively creates a shortcut so that fewer paths have to be searched (only the M branch, not the entire A→C→F path). There is an additional savings that presents itself when similar documents are indexed, or when there are siblings that do not share the same tag. In FIG. 3 there is one A→C→F path, but there is also an A→C→G path. With the M token representing A→C→F paths, a partially correct path like A→C→G never has to be checked. This is a two-fold savings from this path compression using the token dictionary.

There are other opportunities provided by token reordering. One advantage to using tokens is that they can be reordered to provide multiple paths through an index structure, without losing any information, and without complete path duplication. For instance, returning to FIG. 3, there is an A→C→F path that leads to a company name. This can be reordered and stored as F→C→A, but still point to the data item "Goods Inc.", to thereby accomplish more than one path that lead to the same data item. This type of reordering is possible within an index built on tokens, but not readily realizable in a relational system. Reordering paths in a relational system (and maintaining good search performance) requires duplication of tables or using materialized views. Either potential relational solution is very costly in terms of space.

Beyond simple path reordering, paths may also be "shortcut." Instead of using an M to represent A→C→F users may be interested in all F tokens (Buyer and Seller Names in FIG. 1). Since the XML is stored as a tree, searches begin at the root of the tree and proceed downward. When looking for just F tokens, the entire document tree must be searched to find the F tokens. An obvious solution is to use an external index, like an inverted list, to store all F tokens and do lookups from there. While obvious, the inverted list requires space beyond the main index, it adds the complexity of maintaining two types of indexes, and adds the cost of maintaining strict integrity constraints between the inverted list and the main index during inserts, deletes, and updates.

Figure 12:
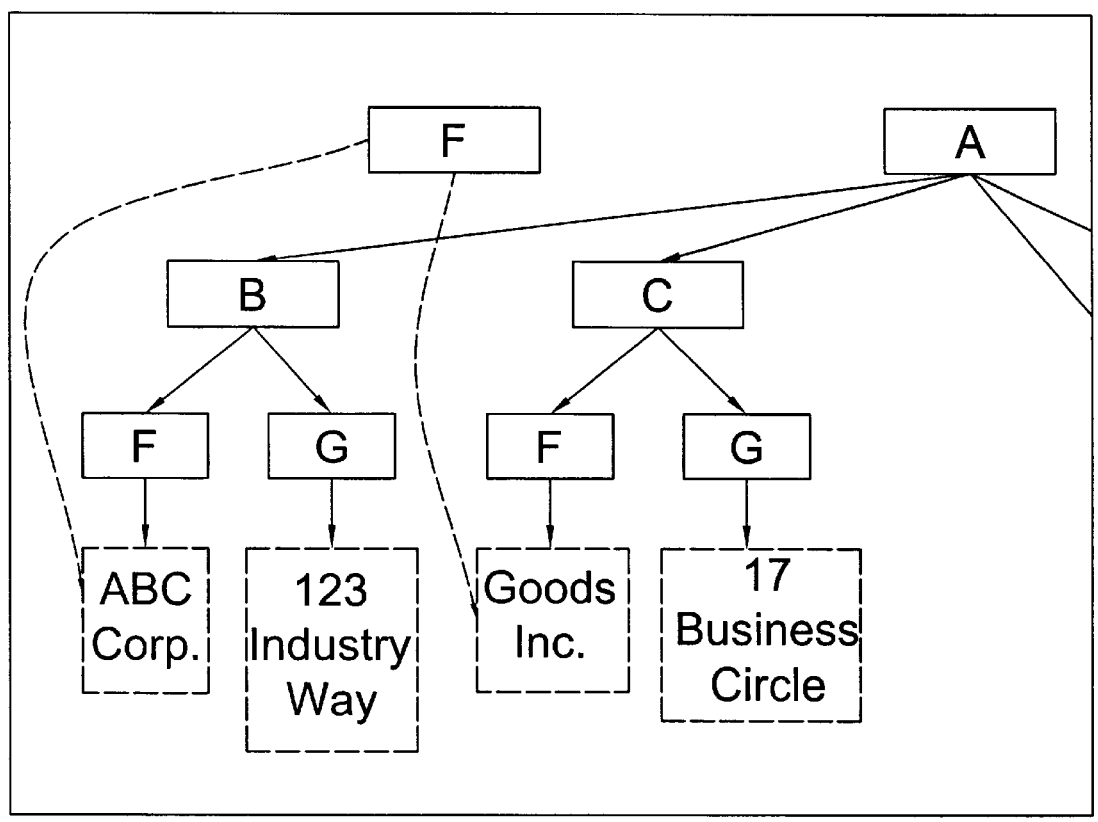
FIG. 12 illustrates schematically a Shortcut Path Optimization in accordance with one preferred embodiment of the invention.

A more direct and consistent approach would be to add paths from the root with the F token that pointed directly to the F objects. An example of this type of shortcut is shown in FIG. 12. With this approach, all original paths are preserved but quick access to particular objects is also allowed (as well as in FIG. 11).

Having referred to issues of optimization, there follows a discussion, which exemplifies querying over semi-structured (XML) data that is indexed by a layered index, in accordance with a preferred embodiment of the invention. The invention is by no means bound by this particular querying and indexing example.

Generally speaking, queries over relational data sources return relational data. It is a simple task to query a relational source using a modem query language, such as SQL, because tie schema is fixed. A fixed schema means that users know what the returned data will look like at the time they pose the query. It also means that the queries are simple to formulate.

Queries over semi-structured data sources are a bit more difficult to handle. Users may not always know at query time what the results should look like. Semi-structured queries should return whatever available data matches the query. In the case of XML data, this means returning an XML fragment that corresponds to a subtree that has certain properties specified by the query. For example, reverting to FIG. 1, one may ask for "Invoice→Buyer," where "Invoice→Buyer→Name='ABC Corp.'." This is equivalent to asking "give me the address information from an invoice where the buyer is ABC Corp."

The portion of the query "Invoice→Buyer→Name='ABC Corp.'" corresponds to finding XML of the form <Invoice><Buyer><Name>ABC Corp.</Name> . . . and returning the entire subtree rooted at <Buyer>. The "projection" step consists of simply finding and returning the appropriate <Buyer> subtree, thought more expressive languages may allow for transforming the <Buyer> subtree into a new tree.

By examining current academic and industrial papers on semi-structured query languages, (such as Lorel, XPath and Quilt see S. Abiteboul, D. Quass, J. McHugh, J. Widom, and J. Wiener. "The Lorel Query Language for Semistructured Data." International Journal on Digital Libraries, 1(1):68–88, April 1997.

XML Path Language (XPath), Version 1.0, W3C Recommendation 16, November 1999, Editors: James Clark, Steve DeRose. http://www.w3. org/TR/1999/REC-xpath-19991116. html D Chamberlin, J Robie, and D Florescu. "Quilt: An XML Query Language for Heterogenous Data Sources." International Workshop on the Web and Databases WebDB'2000), Dallas, Tex., May 2000.)

one finds the following primary query predicates for semi-structured data:

1. Structural existence: find XML fragments that have a particular branching structure, e.g. <A><B></B><C></C></A>, where <A> may not be the root.

Rooted structural existence (special case): find XML documents with a certain structure, starting at the root 2. Simple path expressions: find XML of the form A→B→C="XYZ" (where <A> may not be the root)

Rooted simple path expressions (special case); find XML of the form root→A→B→C="XYZ"

3. General path expressions: like simple path expressions, except that wildcards may be used:

A→(S1|S2)→B: a path looks like either A→S1→B or A→S2→B

A→(S)?→B: A path may or may not have S, e.g. either A→S→B or A→B matches A→(S)+→B: A path with one or more S components, e.g. A→S→B, A→S→S→B, A→S→S→S→B, . . .

A→(S)*→B: A path with zero or more S components
   %: A wildcard for characters in a component label. e.g. A→S%→B looks for labels starting with S, A→%S%→B looks for labels containing S, etc.

A→(%)*→B: Find an A, followed by any number of labels with any name, followed by a B 4. Path expressions with text intermixed: A particular child is followed only if that child encompasses certain text, e.g. A→B only if A's text is "foo."

5. AND: Find a subtree with two properties, e.g. Find A→B such that A→B→C="foo" AND A→B→D="bar"

6. OR: Find a subtree with either of two properties, e.g. Find A→B such that A→B→C="foo" OR A→B→C="bar"

7. Order: Find a subtree where the nth child is X, the nth child is Y, etc. English examples of queries involving order are of the form: "find DBLP records where the first author is 'Brian Cooper'" or "find invoices where the first item is 'hammers' and the second item is 'nails.'"

In a database management system, the "query processor" component answers queries using a tree of query operators. Each query operator performs a simple task. Complex queries are formed by combing multiple operators. In the case of Layered Index, the following operators are useful:

Key lookup: Look for a complete key in the index and return the associated pointer (or set of pointers) to data. For example, if the key is "ABCfoo," then look for that key by traversing the Layered Index to the leaf, and retrieve the pointers from the leaf.

Prefix key lookup: Look up the prefix of a key in the index, and return all of the children of that prefix in the index. For example, the prefix may be "AB," and looking up this prefix will allow us to find "ABCfoo," "ABDbar," "ABbaz" and so on. Prefix search means finding a node in the vertical portion of the Layered Index, and then traversing the entire subtrie rooted at this node to find all of the leaves and pointers. The horizontal index is followed according to the prefix until getting to a leaf block of the index, and in the leaf block the node that represents the prefix is found. Then, the vertical index is followed wholly within the leaf layer to fund all of the children.

Pointer set intersection: Perform an intersection over a set of pointers.

Pointer set union: Perform a union over a set of pointers.

Turning now to smart paths (constituting non-explicit structural information that is associated with the data as they may not appear in the original XML data), it may be recalled that smart paths correspond to particular queries. These queries may be parameterized, e.g. "Select invoices where the buyer is X and the seller is Y." Such queries imply the existence of a particular structure coupled with certain data values at the leaves of that structure. The structure may be very general, for example corresponding to a general path expression.

Answering a query for which there are smart paths is staightforward, Of course, a query must supported by an existing smart path to use this approach. A query parser could determine if a posed query overlaps an available smart path, even if they have slightly different forms. Imagine a smart path that represents "<Invoice><Buyer /><Seller /> . . . " with a designator "Z" in the Layered Index. For the query "Find invoices where the buyer is IBM and the seller is RightOrder," the query processor extracts "IBM" and "RightOrder" and forms them into a key like "ZIBMRightOrder." After that, the query processor uses the key lookup operator to find the documents that match this query. This entails a single index lookup since the query processor needs to search for only one key.

In some cases, smart paths can support queries that do not exactly match the intended query. For example, a template for finding invoices with a particular buyer and seller can also support the query "Find invoices where the buyer is X." This is because the query can be answered by looking for keys prefixed with "Zbuyer." Again, one can use the prefix key lookup operator to find the answer to the query. On the other hand, it is difficult to use the same smart path for The query "find invoices where the seller is Y," since that requires looking for keys of the form "Z*seller," where the * is any string. Thus, to answer the query using this smart paths it is required to "skip over" the middle component of the key, which is potentially very hard to do. However, smart paths were not intended to support arbitrary queries, just those that the database administrator optimizes for before query time.

Turning now to the original paths (constituting explicit structural information that is associated with the data as they appear in the original XML data), they are present in the original semi-structured data, reflect the complete structure of the data, and thus support more queries. However, because the paths are structured like the data, and not like the queries, these paths may be more difficult to search than smart paths. (Since smart paths never require more than one lookup for a query, it is actually impossible to be more efficient than smart paths, but some queries will be "as good.")

In the discussion below there are shown some ways of handling the semi-structured queries (listed above) using the original path information. There may be more efficient techniques that require further exploration, but here are some techniques to use the index to support particular query types. The invention is of course not bound by the specific examples discussed below.

Rooted Structural Existence:

To find documents containing a particular structure starting at the root, the query structure is encoded in the same way that the original paths are. For example, a query of the form "Find documents with <A><B><C>" becomes a query for "ABC" (if A, B, and C are the tokens for <A>, <B> and <C>). This query likely corresponds to a prefix of a set of keys inserted into the index. For example, if documents are structured <A><B><C> data<C></B><A>, there will be keys of the form "ABCdata.". The prefix key lookup operator is used, searching for "ABC," to find the answer to the query.

Rooted Simple Path Expressions:

These queries look for a constant at the leaf of a path, and correspond to a complete root-to-leaf traversal of the Layered Index Consequently, a search key can be formed in the same way that the original paths are formed, and use the key lookup operator, For example, if the query is find documents with "<A><B><C>data</C></B ></A>," a complete key "ABCdata" is formed and thereafter a single lookup in the Layered Index for that key is performed.

Path Expressions with Text Intermixed:

Consider the following semi-structured data fragment: <A>alpha<B>beta<B></A>. The text elements "alpha" and "beta" are leaves, and this fragment can be encoded as two keys: "Aalpha" and "ABbeta." Previous work takes this approach to data encoding multiple paths, and it can be supported in the Layered Index (e.g. Lore, Xpath, specified above).

1. Search with the key lookup operator for "Aalpha"
2. Search with the key lookup operator for "ABbeta"
3. Use the pointer set intersection operator over the results of 1 and 2 to yield candidate results General Path Expressions:

These queries can be divided into two classes: queries that can be expanded into a finite set of simple path expressions, and those that expand to an infinite set of simple path expressions. For example, A→(S1|S2)→B expands to two queries, A→S1→B and A→S2→B. In contrast, A→(S)*→B expands to an infinite set (e.g. A→B, A→S→B, A→S→S→B, etc.), as does A→(S)+→B.

If the query expands to a finite set of queries, the query processor can run each query individually using separate key lookup operators. This requires multiple traversals of the Layered Index, but each simple traversal is efficient so the query is answered relatively efficiently. For example;

Query: A→(S1|S2)→B
  Search: A→S1→B and A→S2→B
Query: A→(S)%→B
  Search: A→B and A→S→B
Query: A→S%→B
  Search: look in the token dictionary for all tags that start with S. Then search for A→S1→B, A→S2→B, A→S3→.B . . . where S1, S2, S3, etc. are the tags that start with S
Query: A→(S)?→(T)?→B
  Search: A→B, A→S→B, A→T→B, and A→S→T→B It is possible that the finite set of queries is actually quite large. For example, the query A→B%→C%→D%→E%→F could be expanded to many queries if there are many tags that start with B, C, D and E. In this case, there are other approaches to naively running all of the queries; these techniques are well known per se and therefore will not discussed herein.

If the query expands to a finite set, then it is harder to answer efficiently. This happens when the query includes * or +. In this case, the query processor can follow every path that looks like it might match the query. For example, A→(%)*→C means "find every C that has an ancestor tagged A." To answer this query, the processor starts by using the prefix key lookup operator to search for the A prefix, and then follows every child of the A prefix node to see if there is a C tag somewhere below. Alternatively, the general prefix key lookup operator could return all children of the A prefix, and then the filter out the children that did not have a C tag subordinated.

Nonetheless, this approach is still potentially expensive. Maintaining an external DataGuide and/or structural statistics could be useful for allowing the query processor to prune much of the search space. For example, the query processor may look in a DataGuide to find that A→B→C and A→D→C exists, but that no other paths could match the query A→(%)*→C. Thus, the query can be answered by using just two key lookup operators to search the Layered Index, one for A→B→C and one for A→D→C.

AND:

The AND of two search predicates can be answered by running both predicates and taking the intersection of the results using the pointer set intersection operator. For example, the AND of two simple path expressions can be answered by creating two key lookup operators and stacking a pointer set intersection operator on ton.

OR:

OR can be answered like AND except that we use the pointer set union operator instead of the set intersection operator.

Order

XML query languages can specify order, e.g. "find papers where the first author is X." The original paths in the semi-structured data include order information but require for implementation considerations the use of 'O' token discussed above. Since storing order requires an additional token, a query that specifies order should preferably be answered in two steps. First, the query is stripped of order information and run as if order did not matter. Then, the result set is inspected to find candidates that match the desired order. This last step can be achieved either examining the data itself, or by leveraging an available "O" token.

In summary, the main query primitives in languages like Lorel, Quilt and XPath (among others) are supported by the Layered Index through a few simple operators. The most complicated queries may require multiple traversals through the index, but is still superior to parsing and examining the data, and are also better than using Btree (which always require more traversals). The projection step of a query is handled after the document or fragment is found, but that is acceptable: it is not the job of the index to do projection.

Figure 13:
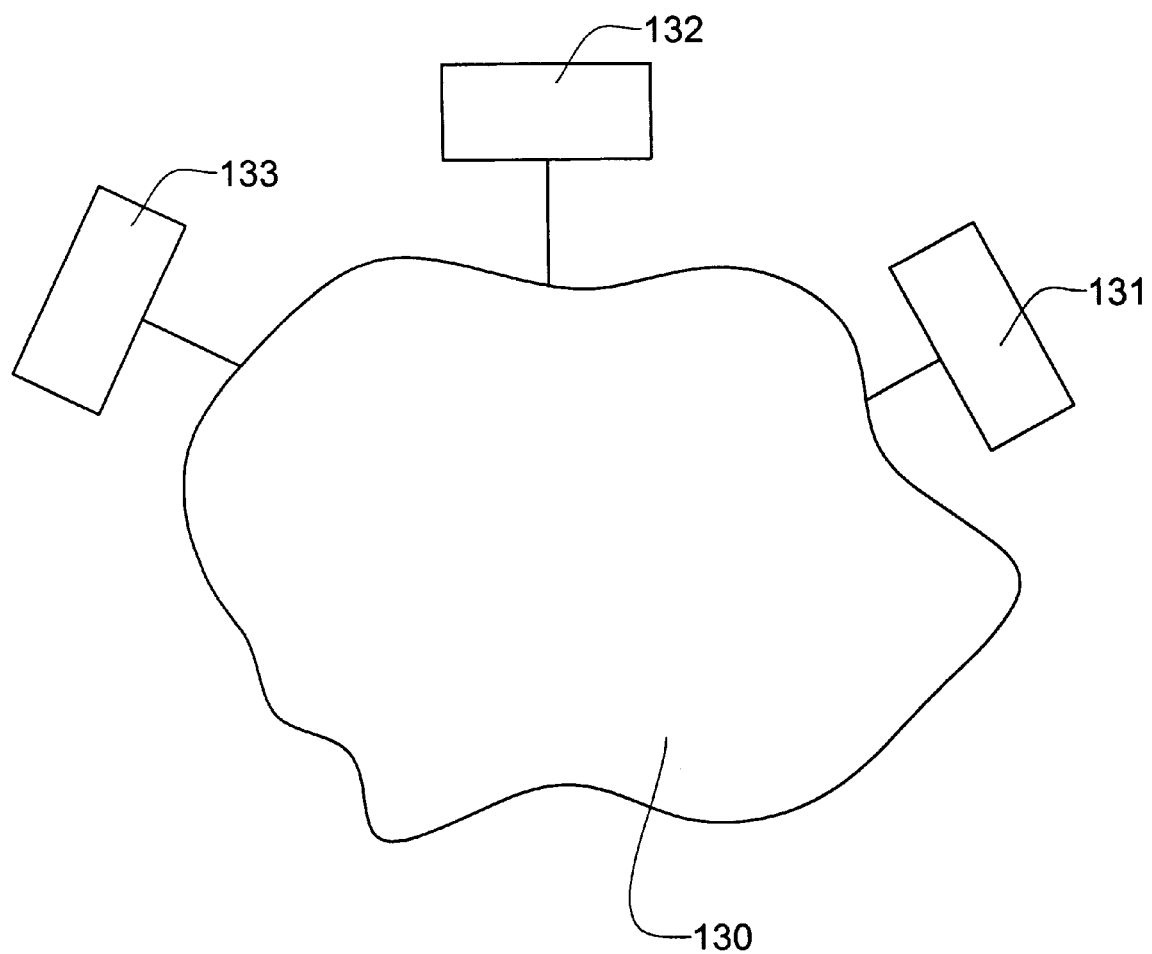
FIG. 13 illustrates a typical yet not exclusive example of a computer system in accordance with one embodiment of the invention.

The present invention can be realized in any computer system including but not limited to that shown in FIG. 13. As shown plurality of computers (of which only three (131) and (132) and (133) are shown) are interlinked by means of network (130). Each computer being e.g. a PC. In accordance with a preferred embodiment the encoding and indexing is realized in a server node, say (131) whereas the querying is realized from a plurality of user nodes, say (132) and (133). The invention is of course not bound by this embodiment By way of non-limiting another embodiment the coding, indexing and querying are all performed in the same node, and in accordance with yet another non limiting preferred embodiment each of the specified tasks is performed in a distinct node.

In the claims that follow, alphabetical characters and roman symbols are used for convenience only and do not necessarily impose any order on the method steps:

It will also be understood that the system according to the invention may be a suitably programmed computer. Likewise, the invention contemplates a computer program being readable by a computer for executing the method of the invention, The invention further contemplates a machine-readable memory tangibly embodying a program of instructions executable by the machine for executing the method of the invention.

The present invention has been described with a certain degree of particularity, but those versed in the art will readily appreciate that various alterations and modifications may be carried out without departing from the scope of the following claims.

What is claimed is:

1. A method for encoding semi-structured data, comprising:

a) providing a semi-structured data input;

b) obtaining an encoded semi-structured data by selectively encoding at least part of said semi-structured data into strings of arbitrary length in a way that at least
  (i) maintains non-structural and structural information associated with the semi-structured data, and
  (ii) the so encoded semi-structured data can be indexed for efficient access; and
    wherein said semi-structured data being a Markup Language (ML) data or representation thereof; and
    wherein said structural information being the markup of said ML and non-structural information being the content of said ML data; and
    wherein said encoding stipulated in step (b) includes:
    i) assigning a token from a token dictionary to each tag or attribute from the markup of said at least part of ML data; if the tag or attribute does not appear in the dictionary, creating a new token and assigning the so created token to said tag or attribute, so as to give rise to intermediate ML tree:
    ii) scanning the intermediate ML tree data obtained in (i) and for representing paths from the root as corresponding strings.

2. The method of claim 1, wherein said step (ii) includes for each one of said paths erasing arrows from a parent to children so as to obtain a resulting string of arbitrary length.

3. The method according to claim 1, wherein step (i) further includes:

(i) creating a unique token in said dictionary for maintaining sibling order of data items and inserting said token to the intermediate ML tree data with edges thereof labeled with ordinal numbers that correspond to the ordered items.

4. A method for constructing a metadata dictionary in respect of semi-structured data, comprising:

a providing a semi-structured data input;

(b) constructing a metadata dictionary that facilitates compressed encoding of at least part of said semi-structured data into strings of arbitrary length in a way that at least maintains non-structural and structural information associated with the semi-structured data, wherein said metadata dictionary being a token dictionary and wherein said construction step includes:

(i) assigning a token from a token dictionary to each tag or attribute from the markup of said at least part of ML data; if the tag or attribute does not appear in the dictionary, creating a new token and assigning the so created token to said tag or attribute.

* * * * *